United States Patent
Hodgkins et al.

(10) Patent No.: US 12,221,353 B2
(45) Date of Patent: Feb. 11, 2025

(54) PLATINUM NANOPARTICLE FUNCTIONALIZED AMINE-MODIFIED FIBROUS HIERARCHICAL ZEOLITE AND METHOD OF MAKING THE SAME

(71) Applicants: Saudi Arabian Oil Company, Dhahran (SA); King Abdullah University of Science and Technology, Thuwal (SA)

(72) Inventors: Robert Peter Hodgkins, Dhahran (SA); Omer Refa Koseoglu, Dhahran (SA); Jean-Marie Maurice Basset, Thuwal (SA); Kuo-Wei Huang, Thuwal (SA); Anissa Bendjeriou Sedjerari, Thuwal (SA); Sathiyamoorthy Murugesan, Thuwal (SA); Manoj Kumar Gangwar, Thuwal (SA)

(73) Assignees: Saudi Arabian Oil Company, Dhahran (SA); King Abdullah University of Science and Tehcnology, Thuwal (SA)

( * ) Notice: Subject to any disclaimer, the term of this patent is extended or adjusted under 35 U.S.C. 154(b) by 0 days.

(21) Appl. No.: 17/412,697

(22) Filed: Aug. 26, 2021

(65) Prior Publication Data

US 2023/0082855 A1    Mar. 16, 2023

(51) Int. Cl.
| | |
|---|---|
| *C08F 8/30* | (2006.01) |
| *C01B 39/02* | (2006.01) |
| *C01B 39/40* | (2006.01) |
| *C07F 15/00* | (2006.01) |
| *C07F 17/02* | (2006.01) |

(52) U.S. Cl.
CPC ............ *C01B 39/026* (2013.01); *C01B 39/40* (2013.01); *C07F 15/0086* (2013.01); *C07F 17/02* (2013.01); *C01P 2002/85* (2013.01); *C01P 2002/86* (2013.01); *C01P 2004/03* (2013.01); *C01P 2004/04* (2013.01)

(58) Field of Classification Search
None
See application file for complete search history.

(56) References Cited

U.S. PATENT DOCUMENTS

| | | |
|---|---|---|
| 9,580,328 B2 | 2/2017 | Martinez et al. |
| 10,196,465 B2 | 2/2019 | Han et al. |
| 2018/0327523 A1* | 11/2018 | Han .................. C08F 8/44 |
| 2019/0040159 A1 | 2/2019 | Han et al. |
| 2021/0023537 A1 | 1/2021 | Viswanadham et al. |

OTHER PUBLICATIONS

Gu et al. ACS Catalysis, 5, 2015, 6893-6901 (Year: 2015).*
Pasha et al. Organometallics, 2014, 33, 3320-3327 (Year: 2014).*
U.S. Appl. No. 17/230,476, filed Apr. 14, 2021.

(Continued)

*Primary Examiner* — Yun Qian
(74) *Attorney, Agent, or Firm* — DINSMORE & SHOHL LLP

(57) ABSTRACT

A functionalized fibrous hierarchical zeolite includes a framework comprising aluminum atoms, silicon atoms, and oxygen atoms, the framework further comprising a plurality of micropores and a plurality of mesopores. The functionalized fibrous hierarchical zeolite is functionalized with at least one amine. A plurality of nanoparticles comprising platinum are immobilized on the framework.

19 Claims, 8 Drawing Sheets

(56) References Cited

OTHER PUBLICATIONS

U.S. Appl. No. 17/230,491, filed Apr. 14, 2021.
U.S. Appl. No. 17/230,524, filed Apr. 14, 2021.
U.S. Appl. No. 17/230,532, filed Apr. 14, 2021.
U.S. Appl. No. 17/230,555, filed Apr. 14, 2021.
U.S. Appl. No. 17/412,733, filed Aug. 26, 2021.
U.S. Appl. No. 17/412,748, filed Aug. 26, 2021.
U.S. Appl. No. 17/412,817, filed Aug. 26, 2021.
Bonati et al. "Synthesis, Characterization, and Catalytic Properties of Novel Single-Site and Nanosized Platinum Catalysts" Organometallics 2012, 31, 5243-5251, 9 pgs.
Jeantelot et al. "TiO2-supported Pt single atoms by surface organometallic chemistry for photocatalytic hydrogen evolution" Phys. Chem. Chem. Phys., 2019, 21, 24429, 12 pgs.
Legagneux et al. "Grafting Reaction of Platinum Organometallic Complexes on Silica-Supported or Unsupported Heteropolyacids" Organometallics 2011, 30, 1783-1793, 11 pgs.
Xu et al. "Bimetallic Pt—Sn nanocluster from the hydrogenolysis of a well-defined surface compound consisting of [(AlO--)Pt(COD)Me] and [(AlO--)SnPh3] fragments for propane dehydrogenation" Journal of Catalysis 374 (2019) 391-400, 10 pgs.
Lee et al., "Organic functionalization of mesopore walls in hierarchically porous zeolites" Chem.Commun., 74-76 (Year: 2009).
U.S. Office Action dated Oct. 26, 2022 pertaining to U.S. Appl. No. 17/412,773, filed Aug. 26, 2021, 15 pages.

\* cited by examiner

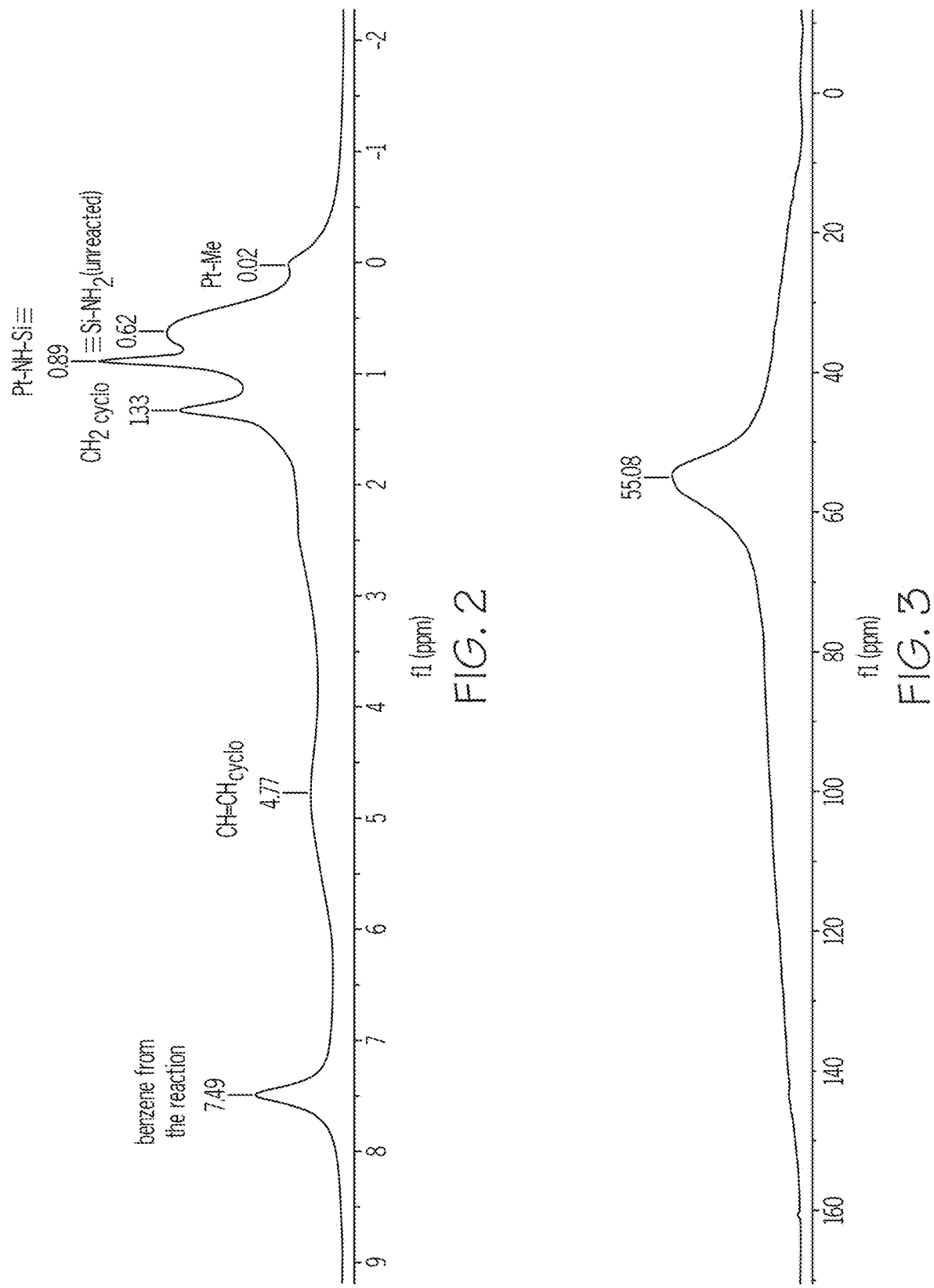

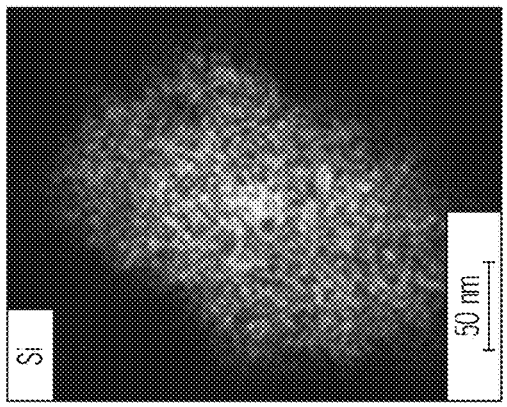
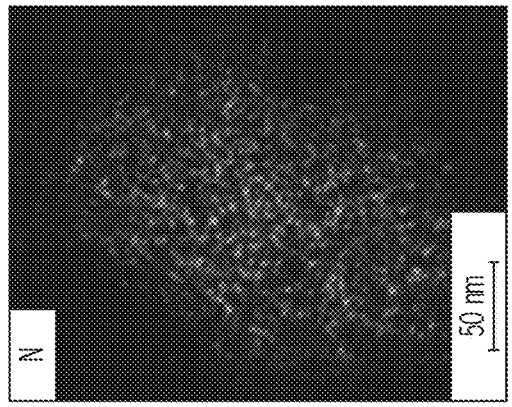
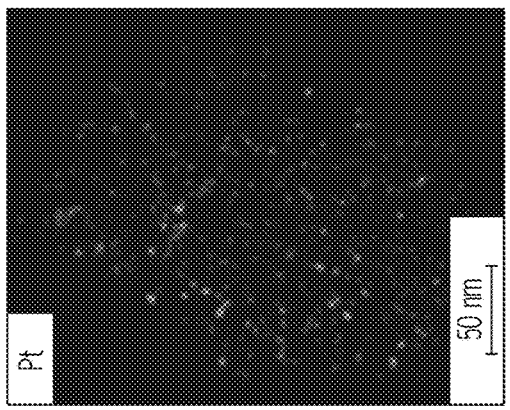
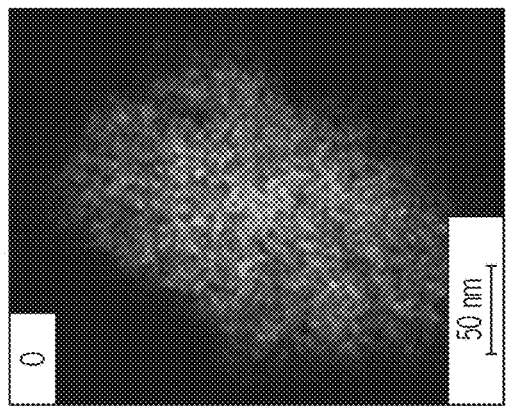
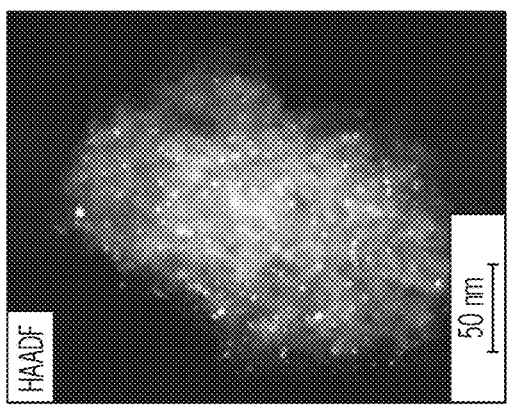
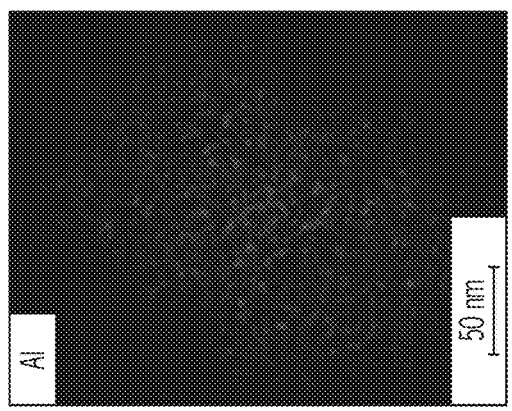
FIG. 8

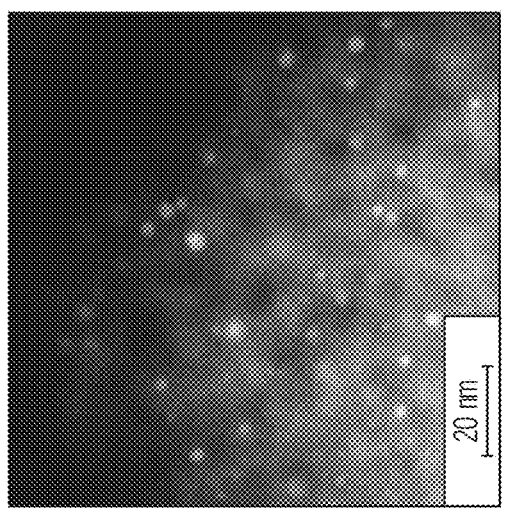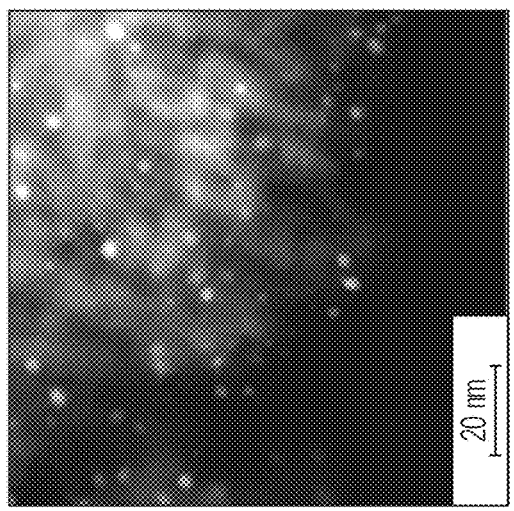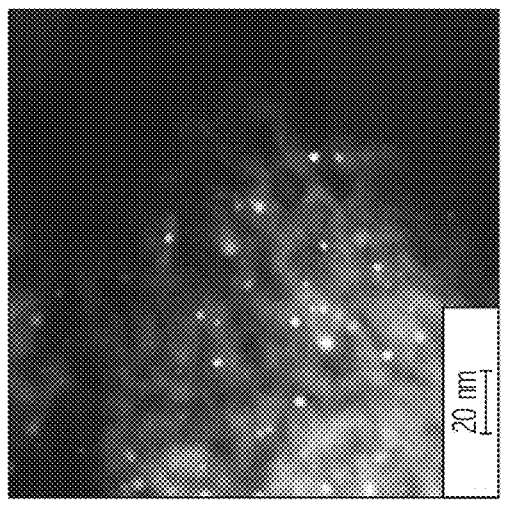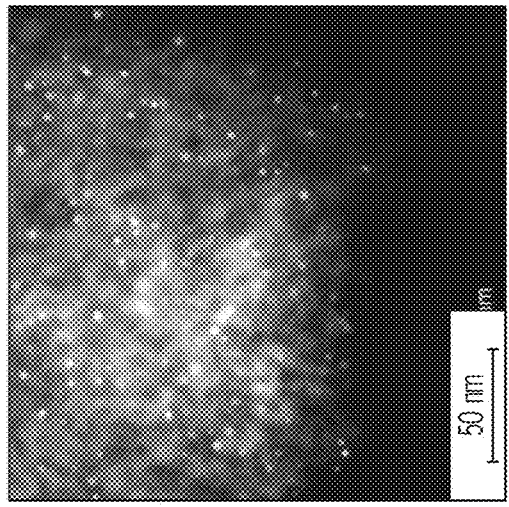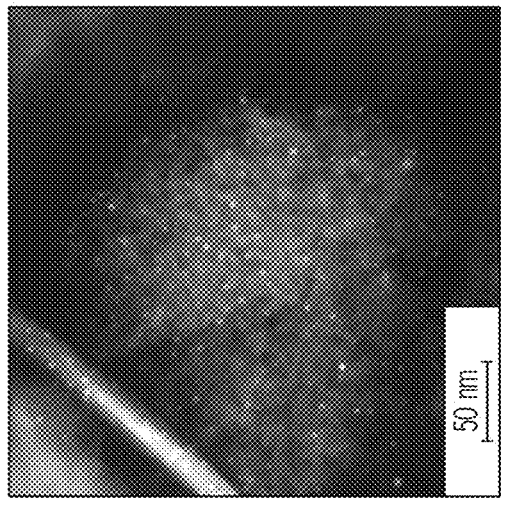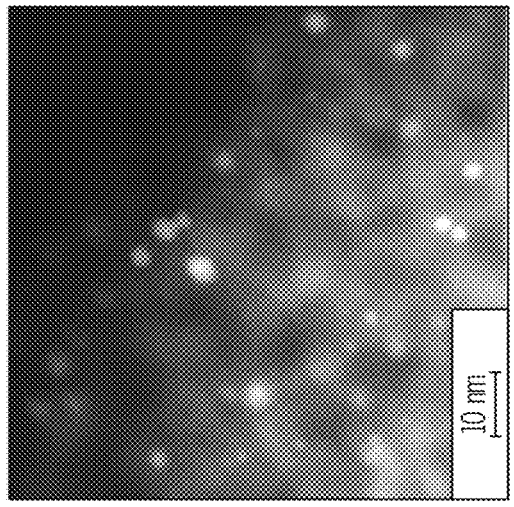
FIG. 9

PLATINUM NANOPARTICLE FUNCTIONALIZED AMINE-MODIFIED FIBROUS HIERARCHICAL ZEOLITE AND METHOD OF MAKING THE SAME

TECHNICAL FIELD

The present disclosure generally relates to porous materials and, more specifically, to zeolites.

BACKGROUND

Materials that include pores, such as zeolites, may be utilized in many petrochemical industrial applications. For example, such materials may be utilized as catalysts in a number of reactions which convert hydrocarbons or other reactants from feed chemicals to product chemicals. Zeolites may be characterized by a microporous structure framework type. Various types of zeolites have been identified over the past several decades, where zeolite types are generally described by framework types, and where specific zeolite materials may be more specifically identified by various names such as ZSM-5 or beta-zeolite.

BRIEF SUMMARY

The present application is directed to functionalized amine-modified zeolites. Such functionalized amine-modified zeolites may, according to various embodiments, include platinum nanoparticle functionalization. Such functionalized amine-modified zeolites, according to one or more embodiments presently disclosed, may have enhanced or differentiated catalytic functionality as compared to conventional zeolites. Additionally or alternatively, the functionalized amine-modified zeolites may be useful as zeolite substrates upon which additional chemical transformations may take place.

In accordance with one or more embodiments of the present disclosure, a functionalized fibrous hierarchical zeolite includes a framework comprising aluminum atoms, silicon atoms, and oxygen atoms, the framework further comprising a plurality of micropores and a plurality of mesopores. The functionalized fibrous hierarchical zeolite is functionalized with at least one amine. A plurality of nanoparticles comprising platinum are immobilized on the framework.

In accordance with one or more embodiments of the present disclosure, a method for making a functionalized fibrous hierarchical zeolite comprising a plurality of nanoparticles comprising platinum includes contacting a fibrous hierarchical zeolite with an organometallic complex comprising a platinum atom, thereby producing a functionalized zeolite comprising isolated terminal organometallic functionalities comprising a platinum atom; and contacting the functionalized zeolite comprising isolated terminal organometallic functionalities comprising a platinum atom with an atmosphere comprising $H_2$, thereby producing the functionalized zeolite comprising a plurality of nanoparticles comprising platinum immobilized on the microporous framework. The fibrous hierarchical zeolite includes a framework comprising aluminum atoms, silicon atoms, and oxygen atoms, the framework further comprising a plurality of micropores and a plurality of mesopores, the fibrous hierarchical zeolite being functionalized with at least one terminal amine. The nanoparticles comprising platinum are immobilized on the framework.

Additional features and advantages of the described embodiments will be set forth in the detailed description, which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 2 provides the magic angle spinning $^1$H solid state Nuclear Magnetic Resonance (NMR) spectrum of a platinum-containing organometallic functionalized amine-modified ZSM-5 zeolite;

FIG. 3 provides the magic angle spinning $^{27}$Al solid state Nuclear Magnetic Resonance (NMR) spectrum of a platinum-containing organometallic functionalized amine-modified ZSM-5 zeolite;

FIG. 8 provides scanning transmission electron microscopy images of a platinum-nanoparticle functionalized amine-modified ZSM-5 zeolite;

FIG. 9 provides transmission electron microscopy images of a platinum-nanoparticle functionalized amine-modified ZSM-5 zeolite.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
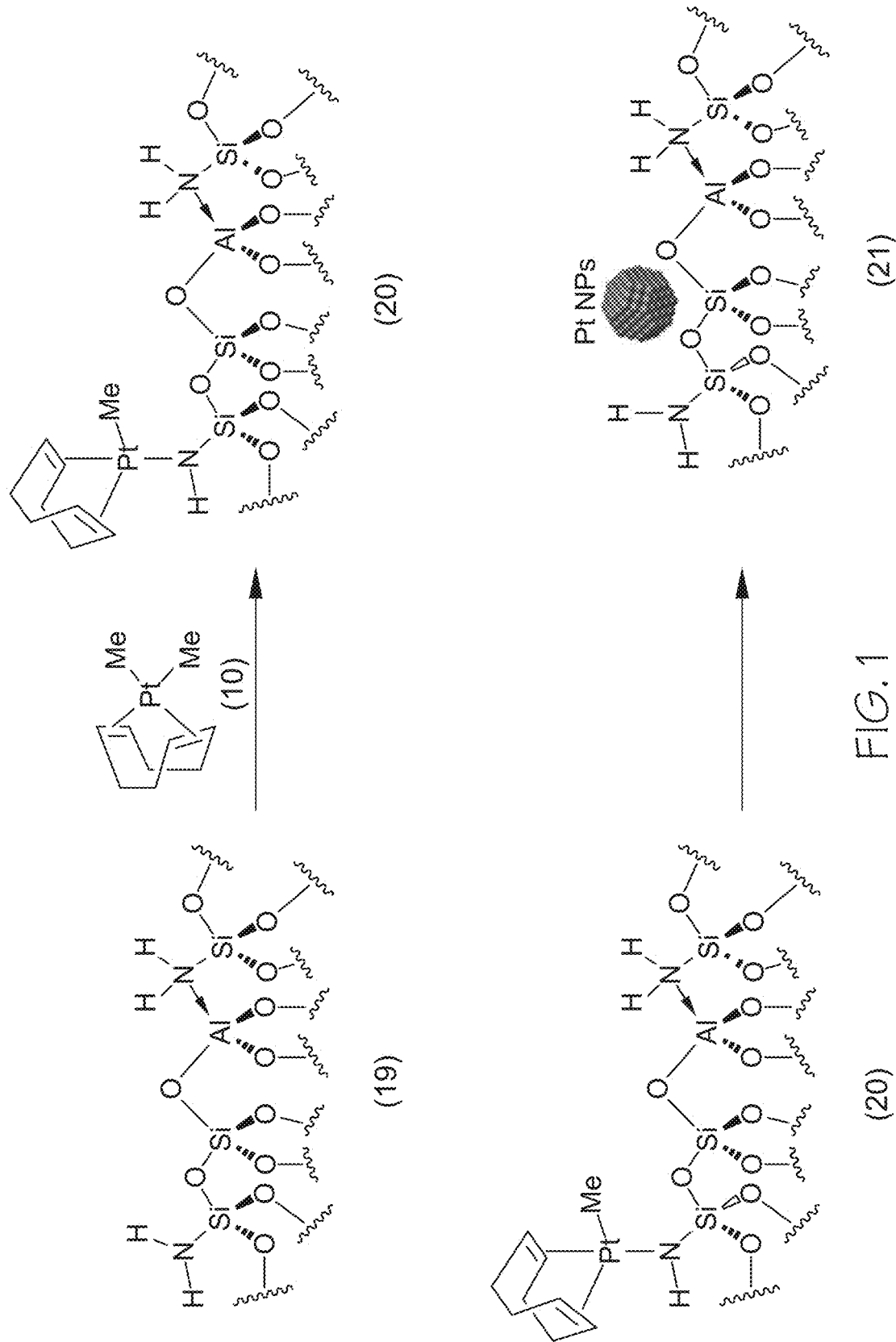
FIG. 1 provides an exemplary reaction scheme to produce the platinum-nanoparticle functionalized amine-modified zeolite.

The present disclosure is directed to amine-modified zeolites that are modified by the inclusion of platinum nanoparticle functionalization. According to embodiments disclosed herein, the functionalized amine-modified zeolites may be formed by a process that includes dehydroxylating an initial zeolite, modifying the dehydroxylated zeolite to include amine functionality, and forming the platinum nanoparticle functionalized zeolite from the amine-modified zeolite. While embodiments of functionalized amine-modified zeolites prepared by this procedure are disclosed herein, embodiments of the present disclosure should not be considered to be limited to zeolites made by such a process.

As presently described, "initial" zeolites (which in some embodiments may be hierarchical mesoporous zeolites) may be supplied or produced, as is presently disclosed. As described herein, the characterization of the structure and material of the zeolite may apply to the initial zeolite as well as the dehydroxylated zeolite and/or amine-modified zeolite and/or the functionalized zeolite. In one or more embodiments, the structure and material composition of the initial zeolite does not substantially change through the dehydroxylation and/or functionalization steps (aside from the described functionalities formed by the dehydroxylation and/or amine modification and/or platinum nanoparticle functionalization steps). For example, the framework type and general material constituents of the framework may be substantially the same in the initial zeolite and the functionalized amine-modified zeolite aside from the addition of the platinum nanoparticles. Additionally, the mesoporosity of the initial zeolite may be carried into the functionalized amine-modified zeolite. Accordingly, when a "zeolite" is described herein with respect to its structural characterization, the description may refer to the initial zeolite, the dehydroxylated zeolite, the amine-modified zeolite, and/or the platinum nanoparticle functionalized amine-modified zeolite.

As used throughout this disclosure, "zeolites" may refer to micropore-containing inorganic materials with regular intra-crystalline cavities and channels of molecular dimension. Zeolites generally comprise a crystalline structure, as opposed to an amorphous structure such as what may be observed in some porous materials such as amorphous silica. Zeolites generally include a microporous framework which may be identified by a framework type. The microporous structure of zeolites (e.g., 0.3 nm to 2 nm pore size) may render large surface areas and desirable size-/shape-selectivity, which may be advantageous for catalysis. The zeolites described may include, for example, aluminosilicates, titanosilicates, or pure silicates. In embodiments, the zeolites described may include micropores (present in the microstructure of a zeolite), and additionally include mesopores. As used throughout this disclosure, micropores refer to pores in a structure that have a diameter of greater than or equal to 0.1 nm and less than or equal to 2 nm, and mesopores refer to pores in a structure that have a diameter of greater than 2 nm and less than or equal to 50 nm. Unless otherwise described herein, the "pore size" of a material refers to the average pore size, but materials may additionally include micropores and/or mesopores having a particular size that is not identical to the average pore size.

Generally, zeolites may be characterized by a framework type which defines their microporous structure. The zeolites described presently, in one or more embodiments, are not particularly limited by framework type. Framework types are described in, for example, "Atlas of Zeolite Framework Types" by Ch. Baerlocher et al, Fifth Revised Edition, 2001, which is incorporated by reference herein. In embodiments, the zeolites may comprise microstructures (which include micropores) characterized as, among others, *BEA framework type zeolites (such as, but not limited to, zeolite Beta), FAU framework type zeolites (such as, but not limited to, zeolite Y), MOR framework type zeolites, or MFI framework type zeolite (such as, but not limited to, ZSM-5). It should be understood that *BEA, MFI, MOR, and FAU refer to zeolite framework types as identified by their respective three letter codes established by the International Zeolite Association (IZA). Other framework types are contemplated in the presently disclosed embodiments.

In one or more embodiments, the zeolite may comprise an aluminosilicate microstructure. The zeolite may comprise at least 99 wt. % of the combination of silicon atoms, oxygen atoms, and aluminum atoms. The molar ratio of Si/Al may be from 2 to 100, such as from 2 to 25, from 25 to 50, from 30 to 50, from 50 to 75, from 75 to 100, or any combination of these ranges.

In one or more embodiments, the zeolite may be an MFI framework type zeolite, such as a ZSM-5. "ZSM-5" generally refers to zeolites having an MFI framework type according to the IZA zeolite nomenclature and comprising mostly silica and alumina, as is understood by those skilled in the art. ZSM-5 refers to "Zeolite Socony Mobil-5" and is a pentasil family zeolite that can be represented by the chemical formula $Na_nAl_nSi_{96}-nO_{192}\cdot16H_2O$, where $0<n<27$. According to one or more embodiments, the molar ratio of silica to alumina in the ZSM-5 may be at least 5. For example, the molar ratio of silica to alumina in the ZSM-5 zeolite may be at least 10, at least 12, or even at least 30, such as from 5 to 30, from 12 to 30, from 5 to 80, from 5 to 300, from 5 to 1000, or even from 5 to 1500. Examples of suitable ZSM-5 zeolite include those commercially available from Zeolyst International, such as CBV2314, CBV3024E, CBV5524G, and CBV28014, and from TOSOH Corporation, such as HSZ-890 and HSZ-891.

In one or more embodiments, the zeolite may comprise an FAU framework type zeolite, such as zeolite Y or ultrastable zeolite Y (USY). As used herein, "zeolite Y" and "USY" refer to a zeolite having a FAU framework type according to the IZA zeolite nomenclature and comprising mostly silica and alumina, as would be understood by one skilled in the art. In one or more embodiments, USY may be prepared from zeolite Y by steaming zeolite Y at temperatures above 500° C. The molar ratio of silica to alumina may be at least 3. For example, the molar ratio of silica to alumina in the zeolite Y may be at least 5, at least 12, at least 30, or even at least 200, such as from 5 to 200, from 12 to 200, or from about 15 to about 200. The unit cell size of the zeolite Y may be from about 24 Angstrom to about 25 Angstrom, such as 24.56 Angstrom.

In one or more embodiments, the zeolite may comprise a *BEA framework type zeolite, such as zeolite Beta. As used in this disclosure, "zeolite Beta" refers to a zeolite having a *BEA framework type according to the IZA zeolite nomenclature and comprising mostly silica and alumina, as would be understood by one skilled in the art. The molar ratio of silica to alumina in the zeolite Beta may be at least 10, at least 25, or even at least 100. For example, the molar ratio of silica to alumina in the zeolite Beta may be from 5 to 500, such as from 25 to 300.

In embodiments, the initial zeolites may include well-defined isolated silanol groups and not completely lose Brnsted acid sites upon dehydroxylation at high temperatures.

Along with micropores, which may generally define the framework type of the zeolite, the zeolites may also comprise mesopores. As a result of having more than one type of pore, the zeolites used in certain embodiments herein may be referred to as "hierarchical zeolites." As used herein a "mesoporous zeolite" refers to a zeolite which includes mesopores, and may have an average pore size of from 2 to 50 nm. The presently disclosed hierarchical zeolites may have an average pore size of greater than 2 nm, such as from 4 nm to 16 nm, from 6 nm to 14 nm, from 8 nm to 12 nm, or from 9 nm to 11 nm. In some embodiments, the majority of the mesopores may be greater than 8 nm, greater than 9 nm, or even greater than 10 nm. The mesopores of the hierarchical zeolites described may range from 2 nm to 40 nm, and the median pore size may be from 8 nm to 12 nm. In embodiments, the mesopore structure of the zeolites may be fibrous, where the mesopores are channel-like. As described herein, "fibrous zeolites" may comprise reticulate fibers with interconnections and have a dense inner core surrounded by less dense outer fibers. Generally, fibrous zeolites may comprise intercrystalline voids between the fibers where the voids between the less dense, outer fibers are mesopore sized and give the fibrous zeolite its mesoporosity. The hierarchical zeolites described may be generally silica-containing materials, such as aluminosilicates, pure silicates, or titanosilicates. It should be understood that while hierarchical zeolites are referenced in one or more portions of the present disclosure, some zeolites may not be mesoporous. For example, some embodiments may utilize zeolites which have an average pore size of less than 2 nm, or may not have mesopores in any capacity.

The hierarchical zeolites described in the present disclosure may have enhanced catalytic activity as compared to non-mesoporous zeolites. Without being bound by theory, it is believed that the microporous structures provide for the majority of the catalytic functionality of the hierarchical zeolites described. The mesoporosity may additionally allow for greater catalytic functionality because more micropores are available for contact with the reactant in a catalytic reaction. The mesopores generally allow for better access to microporous catalytic sites on the hierarchical zeolite, especially when reactant molecules are relatively large. For example, larger molecules may be able to diffuse into the mesopores to contact additional catalytic microporous sites. Additionally, mesoporosity may allow for additional grafting sites on the zeolite where organometallic moieties may be bound.

In embodiments, the hierarchical zeolites may have a surface area of greater than or equal to 300 $m^2/g$, greater than or equal to 350 $m^2/g$, greater than or equal to 400 $m^2/g$, greater than or equal to 450 $m^2/g$, greater than or equal to 500 $m^2/g$, greater than or equal to 550 $m^2/g$, greater than or equal to 600 $m^2/g$, greater than or equal to 650 $m^2/g$, or even greater than or equal to 700 $m^2/g$, and less than or equal to 1,000 $m^2/g$. In one or more other embodiments, the hierarchical zeolites may have pore volume of greater than or equal to 0.2 $cm^3/g$, greater than or equal to 0.25 $cm^3/g$, greater than or equal to 0.3 $cm^3/g$, greater than or equal to 0.35 $cm^3/g$, greater than or equal to 0.4 $cm^3/g$, greater than or equal to 0.45 $cm^3/g$, greater than or equal to 0.5 $cm^3/g$, greater than or equal to 0.55 $cm^3/g$, greater than or equal to 0.6 $cm^3/g$, greater than or equal to 0.65 $cm^3/g$, or even greater than or equal to 0.7 $cm^3/g$, and less than or equal to 1.5 $cm^3/g$. In further embodiments, the portion of the surface area contributed by mesopores may be greater than or equal to 20%, greater than or equal to 25%, greater than or equal to 30%, greater than or equal to 35%, greater than or equal to 40%, greater than or equal to 45%, greater than or equal to 50%, greater than or equal to 55%, greater than or equal to 60%, or even greater than or equal to 65%, such as between 20% and 70% of total surface area. In additional embodiments, the portion of the pore volume contributed by mesopores may be greater than or equal to 20%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, or even greater than or equal to 75%, such as between 20% and 80% of total pore volume. Surface area, average pore size, and pore volume distribution may be measured by $N_2$ adsorption isotherms performed at 77 Kelvin (K) (such as with a Micrometrics ASAP 2020 system). As would be understood by those skilled in the art, Brunauer-Emmett-Teller (BET) analysis methods may be utilized.

The hierarchical zeolites described may form as particles that may be generally spherical in shape or irregular globular shaped (that is, non-spherical). In embodiments, the particles have a "particle size" measured as the greatest distance between two points located on a single zeolite particle. For example, the particle size of a spherical particle would be its diameter. In other shapes, the particle size is measured as the distance between the two most distant points of the same particle when viewed in a microscope, where these points may lie on outer surfaces of the particle. The particles may have a particle size from 25 nm to 900 nm, from 25 nm to 800 nm, from 25 nm to 700 nm, from 25 nm to 600 nm, from 25 nm to 500 nm, from 50 nm to 400 nm, from 100 nm to 300 nm, or less than 900 nm, less than 800 nm, less than 700 nm, less than 600 nm, less than 500 nm, less than 400 nm, less than 300 nm, or less than 250 nm. Particle sizes may be determined by visual examination under a microscope.

The hierarchical zeolites described may be formed in a single-crystal structure, or if not single crystal, may be comprised of a limited number of crystals, such as 2, 3, 4, or 5. The crystalline structure of the hierarchical zeolites may have a branched, fibrous structure with highly interconnected intra-crystalline mesopores. Such structures may be advantageous in applications where the structural integrity of the zeolite is important while the ordering of the mesopores is not.

According to one or more embodiments, the hierarchical zeolites described in the present disclosure may be produced by utilizing cationic polymers, as is subsequently described in the present disclosure, as structure-directing agents. The cationic polymers may function as dual-function templates for synthesizing the hierarchical zeolites, meaning that they act simultaneously as a template for the fabrication of the micropores and as a template for the fabrication of the mesopores.

According to various embodiments, the hierarchical zeolites described in the present disclosure may be produced by forming a mixture comprising the cationic polymer structure-directing agent (SDA), such as poly($N^1,N^1$-diallyl-$N^1$-methyl-$N^6,N^6,N^6$-tripropylhexane-1,6-diamonium bromide), referred to as (PDAMAB-TPHAB) and shown in formula (1), and one or more precursor materials, which will form the structure of the hierarchical zeolites. The precursor materials may contain the materials that form the porous structures, such as alumina and silica for an aluminosilicate zeolite, titania and silica for a titanosilicate zeolite, and silica for a pure silica zeolite. For example, the precursor materials may be one or more of a silicon-containing material, a titanium-containing material, and an aluminum-containing material. For example, at least $NaAlO_2$, tetraethylorthosilicate, and the cationic polymer may be mixed in an aqueous solution to form an intermediate material that will become a mesoporous aluminosilicate zeolite. It should be appreciated that other precursor materials that include silica, titania, or alumina may be utilized. For example, in other embodiments, tetraethylorthosilicate and cationic polymers may be combined to form an intermediate material that will become a silicate hierarchical zeolite; or tetra-ethylorthosilicate, tetrabutylorthotitanate, and cationic polymer may be combined to form an intermediate material that will become a titanosilicate hierarchical zeolite. Optionally, the combined mixture may be heated to form the intermediate material, and may crystallize under autoclave conditions. The intermediate material may comprise micropores, and the cationic polymer may act as a structure-directing agent in the formation of the micropores during crystallization. The intermediate materials may still contain the cationic polymers which may at least partially define the space of the mesopores following their removal. The products may be centrifuged, washed, and dried, and finally, the polymer may be removed by a calcination step. The calcination step may comprise heating at temperatures of at least about 400° C., 500° C., 550° C., or even greater. Without being bound by theory, it is believed that the removal of the polymers forms at least a portion of the mesopores of the hierarchical zeolite, where the mesopores are present in the space once inhabited by the polymers.

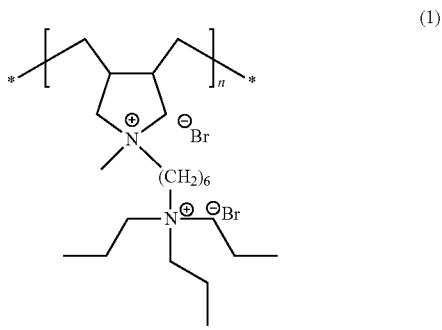

(1)

The precursor materials of the mixture, or reagents of the sol-gel, generally determine the material composition of the hierarchical zeolites, such as an aluminosilicate, a titanosilicate, or a pure silicate. An aluminosilicate hierarchical zeolite may comprise a molar ratio of Si/Al of from 2 to 10,000, from 25 to 10,000, from 50 to 10,000, from 100 to 10,000, from 200 to 10,000, from 500 to 10,000, from 1,000 to 10,000, or even from 2,000 to 10,000. In a pure silicate zeolite, a negligible amount or no amount of aluminum is present in the framework of the zeolite, and the Si/Al molar ratio theoretically approaches infinity. As used herein a "pure silicate" refers to a material comprising at least about 99.9 weight percent (wt. %) of silicon and oxygen atoms in the framework of the zeolite. Other materials, including water and sodium hydroxide, may be utilized during the formation of the material but are not present in the framework of the zeolite. A pure silica hierarchical zeolite may be formed by utilizing only silicon-containing materials to form the framework of the zeolite and no aluminum. A titanosilicate porous structure may comprise a molar ratio of Si/Ti of from 30 to 10,000, from 40 to 10,000, from 50 to 10,000, from 100 to 10,000, from 200 to 10,000, from 500 to 10,000, from 1,000 to 10,000, or even from 2,000 to 10,000. It has been found that PDAMAB-TPHAB cationic polymer, described herein, may be utilized to form mesoporous ZSM-5 zeolites when used with silica and alumina precursor materials, mesoporous TS-1 zeolites when used with a silica and titania precursor, and mesoporous silicalite-I zeolites when used with silica precursors. It has also been found that PDAMAB-TMHAB may be utilized to form mesoporous Beta zeolites when used with silica and alumina precursors.

The cationic polymers presently disclosed may comprise one or more monomers which each comprise multiple cationic functional groups, such as quaternary ammonium cations or quaternary phosphonium cations. The cation functional groups of the monomers may be connected by a hydrocarbon chain. Without being bound by theory, it is believed that the cationic functional groups may form or at least partially aid in forming the microstructure of the hierarchical zeolite (for example, an MFI framework type or BEA framework type) and the hydrocarbon chains and other hydrocarbon functional groups of the polymer may form or at least partially aid in forming the mesopores of the hierarchical zeolite.

The cationic polymers may comprise functional groups, which are utilized as SDAs for the fabrication of the zeolite microstructure. Such functional groups, which are believed to form the zeolite microstructure, include quaternary ammonium cations and quaternary phosphonium cations. Quaternary ammonium is generally depicted in formula (2) and quaternary phosphonium is generally depicted in formula (3).

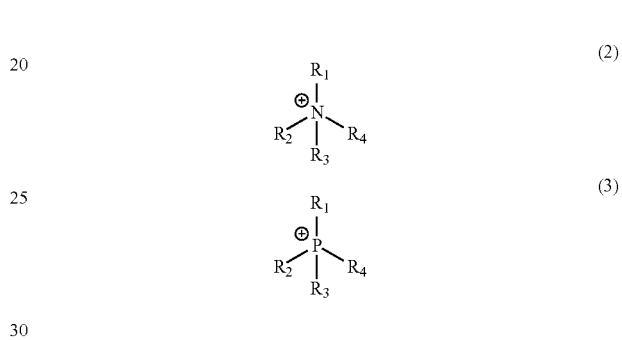

As used throughout this disclosure, the encircled plus symbols ("+") show cationic positively charged centers. One or more of the various R groups may be structurally identical or may be structurally different from one another. In formula (2) and formula (3), $R_1$, $R_2$, $R_3$, and $R_4$ may include hydrogen atoms or hydrocarbons, such as a hydrocarbon chain, optionally comprising one or more heteroatoms. As used throughout this disclosure, a "hydrocarbon" refers to a chemical or chemical moiety comprising hydrogen and carbon. For example, the hydrocarbon chain may be branched or unbranched, and may comprise an alkane hydrocarbon chain, an alkene hydrocarbon chain, or an alkyne hydrocarbon chain, including cyclic or aromatic moieties. In some embodiments, one or more of $R_1$, $R_2$, $R_3$, and $R_4$ may represent hydrogen atoms. As used throughout this disclosure, a heteroatom is a non-carbon and non-hydrogen atom. In embodiments, quaternary ammonium and quaternary phosphonium may be present in a cyclic moiety, such as a five-atom ring, a six-atom ring, or a ring comprising a different number of atoms. For example, in formula (2) and formula (3), the $R_1$ and $R_2$ constituents may be part of the same cyclic moiety.

In one or more embodiments, the two cation moieties may form ionic bonds with anions. Various anionic chemical species are contemplated, including $Cl^-$, $Br^-$, $F^-$, $I^-$, $^-OH$, $\frac{1}{2}SO_4^{2-}$, $\frac{1}{3}PO_4^{3-}$, $\frac{1}{2}S^{2-}$, $AlO_2^-$, $BF_4^-$, $SbF_6^-$, and $B[3,5-(CF_3)_2C_6H_3]_4^-$ (commonly referred to as "BArF"). In some embodiments, an anion with a negative charge of more than $1^-$, such as $2^-$, $3^-$, or $4^-$, may be utilized, and in those embodiments, a single anion may pair with multiple cations of the cationic polymer. As used throughout this disclosure, a fraction listed before an anionic composition means that the anion is paired with more than one cation and may, for example, be paired with the number of cations equal to its negative charge.

In one or more embodiments, a hydrocarbon chain may separate two cations of a monomer from one another. As described above, the hydrocarbon chain may be branched or unbranched, and may comprise an alkane hydrocarbon chain, an alkene hydrocarbon chain, or an alkyne hydrocarbon chain, including cyclic or aromatic moieties. In one embodiment, the length of the hydrocarbon chain (measured as the number of carbons in the chain directly connecting the two cations) may be from 1 to 10,000 carbon atoms, such 1 to 20 carbon atom alkane chains.

The cationic polymers described in this disclosure are generally non-surfactants. A surfactant refers to a compound that lowers the surface tension (or interfacial tension) between two liquids or between a liquid and a solid, usually by the inclusion of a hydrophilic head and a hydrophobic tail. Non-surfactants do not contain such hydrophobic and hydrophilic regions, and do not form micelles in a mixture containing a polar material and non-polar material. Without being bound by theory, it is believed that the polymers described are non-surfactants because of the inclusion of two or more cation moieties, which are joined by a hydrocarbon chain. Such an arrangement has polar charges on or near each end of the monomer, and such an arrangement excludes the hydrophobic segment from the polymer, and thus limits the surfactant behavior (self-assembly in solution). On the atomic scale, it is believed that the functional groups (for example, quaternary ammoniums) on the polymer direct the formation of zeolite structure; on the mesoscale, the polymer functions simply as a "porogen" rather than a structure directing agent in the conventional sense. As opposed to the cases of surfactants, non-surfactant polymers do not self-assemble to form an ordered mesostructure, which in turn favors the crystallization of zeolites, producing a new class of hierarchical zeolites that feature three-dimensionally (3-D) continuous zeolitic frameworks with highly interconnected intracrystalline mesopores.

In one embodiment, the cationic polymer may comprise the generalized structure depicted in formula (4):

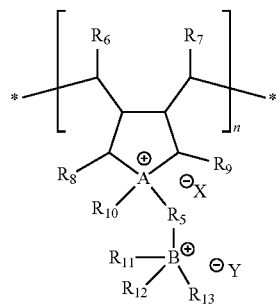

(4)

Formula (4) depicts a single monomer of the cationic polymer, which is signified by the included bracket, where n is the total number of repeating monomers in the polymer. In some embodiments, the cationic polymer may be a copolymer comprising two or more monomer structures. The X and Y of formula (4) independently represent anions, such as $Cl^-$, $Br^-$, $F^-$, $I^-$, $^-OH$, $\frac{1}{2}SO_4^{2-}$, $\frac{1}{3}PO_4^{3-}$, $\frac{1}{2}S^{2-}$, $AlO_2^-$, $BF_4^-$, $SbF_6^-$, and $B[3,5\text{-}(CF3)_2C_6H_3]_4^-$. In some embodiments, an anion with a negative charge of more than $1^-$, such as $2^-$, $3^-$, or $4^-$, may be utilized, and in those embodiments, a single anion may pair with multiple cations of the cationic polymer of formula (4). It should be understood that one or more monomers (such as that shown in formula (4)) of the cationic polymers described in the present application may be different from one another. For example, various monomer units may include different R groups. Referring to formula (4), A and B may independently represent nitrogen or phosphorus. In one embodiment, A and B may both be nitrogen. In one embodiment, A may be nitrogen and B may be phosphorus. In one embodiment, A may be phosphorus and B may be nitrogen. In another embodiment, A and B may both be phosphorus. For example, A may comprise a quaternary ammonium cation or a quaternary phosphonium cation, and B may comprise a quaternary ammonium cation or a quaternary phosphonium cation. As shown in formula (4), A may be a portion of a ring structure, such as a five-membered ring. $R_5$ may be a branched or unbranched hydrocarbon chain, optionally further including at least one heteroatom, having a carbon chain length of from 1 to 10,000 carbon atoms, such as a 2 to 20 carbon alkane, and $R_6$, $R_7$, $R_8$, $R_9$, $R_{10}$, $R_{11}$, $R_{12}$, and $R_{13}$ may independently be a hydrogen atom or a hydrocarbon optionally comprising one or more heteroatoms. For example, one or more of $R_6$, $R_7$, $R_8$, $R_9$, $R_{10}$, $R_{11}$, $R_{12}$, and $R_{13}$ may independently be hydrogen or an alkyl group, such as a methyl group, an ethyl group, a propyl group, a butyl group, or a pentyl group. In embodiments, one or more of $R_6$, $R_7$, $R_8$, and $R_9$ may be hydrogen. In embodiments, one or more of $R_{10}$, $R_{11}$, $R_{12}$, and $R_{13}$ may be the same or different and may be an alkyl group. For example, $R_{10}$ may be a methyl, an ethyl, a propyl, or a butyl group, and one or more of $R_{11}$, $R_{12}$, and $R_{13}$ may independently be a methyl, an ethyl, a propyl, or a butyl group. In one embodiment, $R_{10}$ is a methyl group and $R_{11}$, $R_{12}$, and $R_{13}$ are all propyl groups. In one embodiment, $R_{11}$, $R_{12}$, and $R_{13}$ are all methyl groups. In another embodiment, $R_{11}$, $R_{12}$, and $R_{13}$ are all ethyl groups. In another embodiment, $R_{11}$, $R_{12}$, and $R_{13}$ are all propyl groups.

In one or more embodiments, formula (4) may be a polymer that comprises n monomer units, where n may be from 10 to 10,000,000, such as from 50 to 10,000,000, from 100 to 10,000,000, from 250 to 10,000,000, from 500 to 10,000,000, from 1,000 to 10,000,000, from 5,000 to 10,000,000, from 10,000 to 10,000,000, from 100,000 to 10,000,000, from 1,000,000 to 10,000,000, from 10 to 1,000,000, from 10 to 100,000, from 10 to 10,000, from 10 to 5,000, from 10 to 1,000, from 10 to 500, from 10 to 250, or from 10 to 100. For example, n may be from 1,000 to 1,000,000.

According to one or more embodiments, the cationic polymer comprises poly($N^1,N^1$-diallyl-$N^1$-alkyl-$N^6,N^6,N^6$-trialkylalkane-1,6-diamonium halide), such as poly($N^1,N^1$-diallyl-$N^1$-methyl-$N^6,N^6,N^6$-trialkylhexane-1,6-diamonium bromide). An example of such is PDAMAB-TPHAB, as shown in formula (1).

In another embodiment, the cationic polymer comprises poly($N^1,N^1$-diallyl-$N^1$-methyl-$N^6,N^6,N^6$-triethylhexane-1, 6-diamonium bromide), referred to as (PDAMAB-TEHAB) and shown in formula (5).

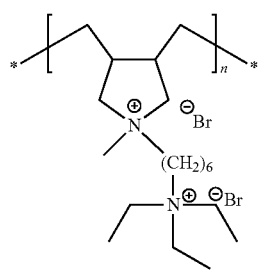

(5)

In another embodiment, the cationic polymer poly($N^1,N^1$-diallyl-$N^1$-methyl-$N^6,N^6,N^6$-trimethylhexane-1,6-diamonium bromide) is referred to as (PDAMAB-TMHAB) and is shown in formula (6).

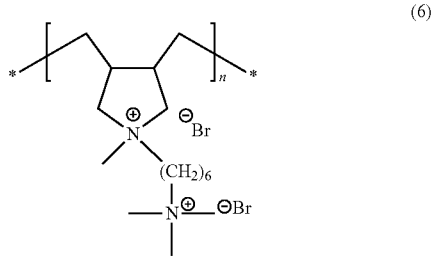

(6)

Other cationic polymers, including co-polymers, capable of acting as cationic polymer structure-directing agents have been disclosed previously. It is envisioned that such cationic polymer structure-directing agents could be used in the synthesis of the zeolites described herein.

According to one or more embodiments disclosed herein, either of the zeolites described above, hierarchical zeolites or conventional non-mesoporous zeolites, may serve as an "initial zeolite" which is then dehydroxylated, forming a dehydroxylated zeolite. In general, the initial zeolite may refer to a zeolite, which is not substantially dehydroxylated and includes at least a majority of vicinal hydroxyl groups. Dehydroxylation, as is commonly understood by those skilled in art, involves a reaction whereby a water molecule is formed by the release of a hydroxyl group and its combination with a proton. As described herein, a "dehydroxylated zeolite" refers to a zeolitic material that has been at least partially dehydroxylated (i.e., H and O atoms are liberated from the initial zeolite and water is formed). Without being bound by theory, it is believed that the dehydroxylation reaction forms a molecule of water from a hydroxyl group of a first silanol and a hydrogen of a second silanol of a zeolite. The remaining oxygen atom of the second silanol functionality forms a siloxane group in the zeolite (i.e., (≡Si—O—Si≡), sometimes referred to as a strained siloxane bridge. These strained siloxane bridges may be reactive in subsequent functionalization steps, as is described herein. Generally, strained siloxane bridges are those formed in the dehydroxylation reaction and not in the formation of the initial zeolite. The initial zeolite may primarily comprise vicinal silanol functionalities. In one or more embodiments, dehydroxylating the initial zeolite may form isolated terminal silanol functionalities comprising hydroxyl groups bonded to silicon atoms of the microporous framework of the dehydroxylated zeolite.

As described herein "silanol functionalities" refer to ≡Si—O—H groups. Silanol groups generally include a silicon atom and a hydroxyl group (—OH). As described herein, "terminal" functionalities refer to those that are bonded to only one other atom. For example, the silanol functionality may be terminal by being bonded to only one other atom such as a silicon atom of the microporous framework. As described herein, "isolated silanol functionalities" refer to silanol functionalities that are sufficiently distant from one another such that hydrogen-bonding interactions are avoided with other silanol functionalities. These isolated silanol functionalities are generally silanol functionalities on the zeolite that are non-adjacent to other silanol functionalities. Generally, in a zeolite that includes silicon and oxygen atoms, "adjacent silanols" are those that are directly bonded through a bridging oxygen atom. Those skilled in the art would understand isolated silanol functionalities may be identified by FT-IR and/or $^1$H-NMR. For example, isolated silanol functionalities may be characterized by a sharp and intense FT-IR band at about 3749 cm$^{-1}$ and/or a $^1$H-NMR shift at about 1.8 ppm. In the embodiments described herein, peaks at or near 3749 cm$^{-1}$ in FT-IR and/or at or near 1.8 ppm in $^1$H-NMR may signify the existence of the dehydroxylated zeolite, and the lack of peaks at or near these values may signify the existence of the initial zeolite.

Isolated silanol functionalities can be contrasted with vicinal silanol functionalities, where two silanol functionalities are "adjacent" one another by each being bonded with a bridging oxygen atom. Formula (7) depicts an isolated silanol functionality and formula (8) depicts a vicinal silanol functionality. Hydrogen bonding occurs between the oxygen atom of one silanol functionality and the hydrogen atom of an adjacent silanol functionality in the vicinal silanol functionality. Vicinal silanol functionality may show a different band in FT-IR and a different $^1$H-NMR shift, such as 3520 cm$^{-1}$ or 3720 cm$^{-1}$ in FT-IR, and 2.7 ppm in $^1$H-NMR. It should be understood that, according to one or more embodiments presently disclosed, the various functional groups of the zeolites may be identified by FT-IR and/or $^1$H-NMR methods. When a zeolite "comprises" such a moiety, such inclusion may be evidenced by a peak at or near the bands in FT-IR and/or $^1$H-NMR corresponding to such moiety. Those skilled in the art would understand such detection methods.

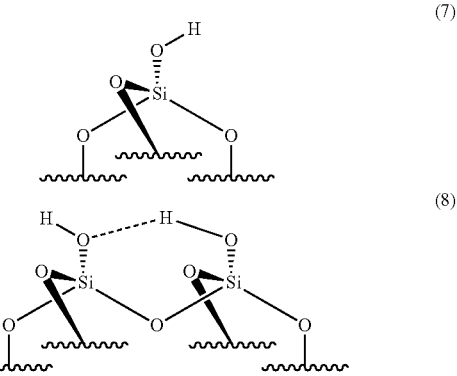

(7)

(8)

In one or more embodiments, the initial zeolite (as well as the dehydroxylated zeolite) comprises aluminum in addition to silicon and oxygen. For example, ZSM-5 zeolite may include such atoms. In embodiments with aluminum present, the microporous framework of the dehydroxylated zeolite may include Brnsted acid silanol functionalities. In the Brnsted acid silanol functionalities, each oxygen atom of the Brnsted acid silanol functionality may bridge a silicon atom and an aluminum atom of the microporous framework. Such Brnsted acid silanol functionalities may be expressed as [≡Si—O(H)→Al≡]. In this representation, a dative bond from oxygen atom electron lone pairs to the aluminum atom is shown by the arrow. Formula (9) depicts an example of an aluminosilicate zeolite framework structure that includes the isolated terminal silanol functionalities and Brnsted acid silanol functionalities described herein.

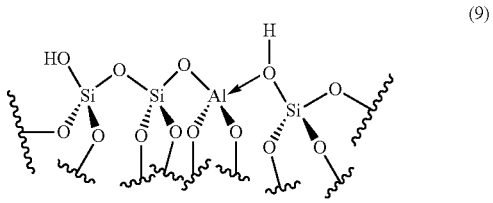

(9)

According to one or more embodiments, the dehydroxylation of the initial zeolite may be performed by heating the initial zeolite at elevated temperatures under vacuum, such as from 700° C. to 1100° C. According to embodiments, the temperature of heating may be from 600° C. to 650° C., from 650° C. to 700° C., from 700° C. to 750° C., from 750° C. to 800 ° C., from 800° C. to 850° C., from 850° C. to 900° C., from 900° C. to 950° C., from 950° C. to 1000° C., from 1000 ° C. to 1050° C., from 1050° C. to 1100° C., or any combination of these ranges. For example, temperature ranges from 650° C. to any named value are contemplated, and temperature ranges from any named value to 1100° C. are contemplated. As described herein, vacuum pressure refers to any pressure less than atmospheric pressure. According to some embodiments, the pressure during the heating process may be less than or equal to $10^{-2}$ mbar, less than or equal to $10^{-2.5}$ mbar, less than or equal to $10^{-3}$ mbar, less than or equal to $10^{-3.5}$ mbar, less than or equal to $10^{-4}$ mbar, or even less than or equal to $10^{-4.5}$ mbar. The heating times may be sufficiently long such that the zeolite is brought to thermal equilibrium with the oven or other thermal apparatus utilized. For example, heating times of greater than or equal to 8 hours, greater than or equal to 12 hours, or greater than or equal to 18 hours may be utilized. For example, about 24 hours of heating time may be utilized.

It is believed that according to one or more embodiments described herein, heating at temperatures below 600° C. may be insufficient to form terminal isolated silanol functionalities. However, heating at temperatures greater than 1100° C. may result in the elimination of terminal isolated silanol functionalities, or the production of such functionalities in low enough concentrations that further processing by contact with organometallic chemicals to form organometallic functionalities is not observed, as is described subsequently herein. Without being bound by any particular theory, it is believed that greater heating temperatures during dehydroxylation correlate with reduced terminal silanols present on the dehydroxylated zeolite. However, it is believed that greater heating temperatures during dehydroxylation correlate with greater amounts of strained siloxanes. For example, when the initial zeolite is heated at 700° C. during dehydroxylation, the concentration of isolated terminal silanol groups may be at least 0.4 mmol/g, such as approximately 0.45 mmol/g in some embodiments, as measured by methyl lithium titration. Dehydroxylating at 1100° C. may result in much less isolated terminal silanol and/or much less isolated Brnsted acid silanol. In some embodiments, less than 10% of the isolated terminal silanol groups present at 700° C. dehydroxylation are present when 1100° C. dehydroxylation heating is used. However, it is believed that strained siloxane groups are appreciably greater at these greater dehydroxylation temperatures.

In one or more embodiments, the dehydroxylated zeolite may be processed to form the amine-modified zeolite. Generally, to form the amine-modified zeolite, ammonia or other amine compounds, such as aniline, at an elevated temperature, may be contacted and/or reacted with the dehydroxylated zeolite. According to one or more embodiments, the temperature for the ammonia treatment may be from 200° C. to 900° C. In particular, the isolated terminal silanol functionalities may be converted to primary amine functionalities on the amine-modified zeolite. Additionally, in embodiments where aluminum is present in the zeolitic framework structure and Brnsted acid silanols are present in the dehydroxylated zeolite, a primary amine may be formed where the nitrogen atom of the primary amine is coordinated with an aluminum atom.

In one or more embodiments, isolated terminal amine functionalities may be bonded to silicon atoms of the microporous framework (sometimes referred to as silylamine groups herein). The isolated terminal amine functionalities may be primary amine functionalities such that the nitrogen atom of the primary amine functionality is bonded to two hydrogen atoms and one silicon atom of the microporous framework. Similar to the description of isolated and terminal in the context of silanol groups in the dehydroxylated zeolite, the isolated terminal amine functionalities refer to amine functionalities which are terminal by being bound to only one other atom (i.e., the silicon atom of the framework of the zeolite in this case) and are isolated by not being adjacent to other amine functionalities. In general, isolated silanol functionalities in the dehydroxylated zeolite may be converted to their corresponding isolated amine functionalities in the amine-modified zeolite.

In one or more embodiments, the amine modified zeolite may be processed to form the platinum nanoparticle functionalized zeolite. Generally, to form the platinum nanoparticle functionalized zeolite, an organometallic complex comprising a platinum atom may be contacted and/or reacted with the amine-modified zeolite, thereby producing a functionalized zeolite comprising isolated terminal organometallic functionalities comprising a platinum atom. The thus functionalized zeolite may then be reacted with an atmosphere comprising $H_2$, thereby forming the platinum nanoparticle functionalized zeolite. Exemplary organometallic complexes comprising a platinum atom include, but are not limited to, complexes of formulae 10-18 and mixtures of two or more thereof.

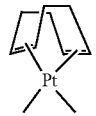

(10)

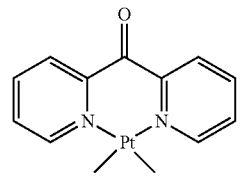

(11)

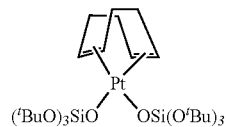

(12)

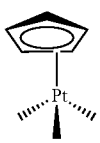

(13)

(14)

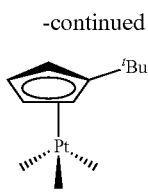

(15)

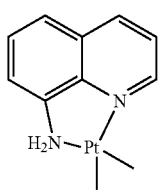

(16)

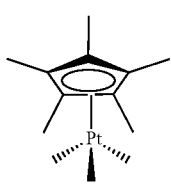

(17)

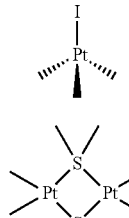

(18)

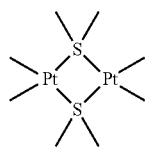

An exemplary reaction scheme to produce the platinum-nanoparticle functionalized zeolite from the amine-modified zeolite is shown in FIG. 1. In particular, the isolated terminal amine functionalities of the zeolite of formula (19) may be reacted with a platinum-containing organometallic compound, such as the platinum organometallic complex of formula (10) as shown, producing methane as a by-product. That is, in addition to the functionalized zeolite comprising isolated terminal organometallic functionalities comprising a platinum atom, such as the functionalized zeolite of formula (20), methane is also produced when the platinum-containing organometallic compound is a complex of formula (10). The functionalized zeolite comprising isolated terminal organometallic functionalities (20) may then be contacted with H2 to produce the platinum-nanoparticle functionalized zeolite of formula (21). Additionally, in embodiments where aluminum is present in the zeolitic framework structure and Brnsted acid amines are present in the amine-modified zeolite, platinum nanoparticles may be associated with the zeolite framework in a manner that allows lone electron pairs of a nitrogen atom to form a coordinate bond with a nearby aluminum atom.

In embodiments, the formation of the functionalized zeolite comprising isolated terminal organometallic functionalities comprising a platinum atom from the amine-modified zeolite may be conducted at a temperature from 15° C. to 30° C., from 16° C. to 30° C., from 17° C. to 30° C., from 18° C. to 30° C., from 19° C. to 30° C., from 20° C. to 30° C., from 21° C. to 30° C., from 22° C. to 30° C., from 23° C. to 30° C., from 24° C. to 30° C., from 25° C. to 30° C., from 15° C. to 29° C., from 15° C. to 28° C., from 15° C. to 27° C., from 15° C. to 26° C., from 15° C. to 25° C., from 15° C. to 24° C., from 15° C. to 23° C., from 15° C. to 22° C., from 15° C. to 21° C., or even from 15° C. to 20° C. In embodiments, the reaction may be conducted at a temperature typically referred to as "room temperature." That is, in embodiments, the reaction may be conduct at about 20° C. or 20±4° C.

In embodiments, the amine-modified zeolite may be allowed to react with the platinum-containing organometallic complex for from 2 hours to 20 hours, from 3 hours to 20 hours, from 4 hours to 20 hours, from 5 hours to 20 hours, from 6 hours to 20 hours, from 7 hours to 20 hours, from 8 hours to 20 hours, from 9 hours to 20 hours, from 10 hours to 20 hours, from 11 hours to 20 hours, from 12 hours to 20 hours, from 13 hours to 20 hours, from 14 hours to 20 hours, from 15 hours to 20 hours, from 16 hours to 20 hours, from 17 hours to 20 hours, from 18 hours to 20 hours, from 19 hours to 20 hours, from 2 hours to 19 hours, from 2 hours to 18 hours, from 2 hours to 17 hours, from 2 hours to 16 hours, from 2 hours to 15 hours, from 2 hours to 14 hours, from 2 hours to 13 hours, from 2 hours to 12 hours, from 2 hours to 11 hours, from 2 hours to 10 hours, from 2 hours to 9 hours, from 2 hours to 8 hours, from 2 hours to 7 hours, from 2 hours to 6 hours, from 2 hours to 5 hours, from 2 hours to 4 hours, or even from 2 hours to 3 hours. In embodiments, the amine-modified zeolite may be allowed to react with the platinum-containing organometallic complex for about 20 hours or 20±4 hours.

It is envisioned that, in various embodiments, the amine-modified zeolite may be allowed to react with the platinum-containing organometallic complex at any combination of temperature and time disclosed herein.

Reaction of the amine-modified zeolite with the platinum-containing organometallic complex may take place in a suitable solvent. Selection of the solvent is within the level of ordinary skill in the art and will be determined in view of multiple factors, such as solubility of the reactants in the solvent, intended temperature of the reaction, and like considerations. In embodiments, the solvent may be a hydrocarbon solvent such as pentane, hexane, heptane, octane, benzene, toluene, xylene, and combinations of two or more thereof. In embodiments, the solvent comprises, consists essentially of, or consists of benzene. In embodiments, the solvent may be an ethereal solvent such as diethyl ether, dimethoxy ethane, tetrahydrofuran (THF), dioxane, and combinations of two or more thereof.

In embodiments, the platinum-containing organometallic functionalized zeolite may then be contacted with hydrogen gas ($H_2$). The $H_2$ may be added to the platinum-containing organometallic functionalized zeolite at a pressure from 0.5 atm to 1.5 atm, from 0.6 atm to 1.5 atm, from 0.7 atm to 1.5 atm, from 0.8 atm to 1.5 atm, from 0.9 atm to 1.5 atm, from 1 atm to 1.5 atm, from 0.5 atm to 1.4 atm, from 0.5 atm to 1.3 atm, from 0.5 atm to 1.2 atm, from 0.5 atm to 1.1 atm, or even from 0.5 atm to 1 atm. In embodiments, the $H_2$ partial pressure is about 1 atm or 1±0.2 atm. In embodiments, the $H_2$ may be supplied in an inert carrier gas. For instance, the carrier gas may be selected from helium gas, neon gas, argon gas, krypton gas, xenon gas, nitrogen gas, and a combination of two or more thereof. In embodiments, the $H_2$ may be supplied as 5 wt % in argon. Without intending to be bound by theory, it is believed that reaction with $H_2$ reduces the platinum-containing organometallic functionalities to provide a platinum nanoparticle functionalized zeolite.

In embodiments, the reaction with $H_2$ may be allowed to proceed for from 0.5 hours to 3.5 hours, such as from 1 hour to 3 hours, from 1.5 hours to 2.5 hours, or about 2±0.5 hours.

Further, this reaction with $H_2$ may proceed at a temperature from 200° C. to 800° C., from 200° C. to 750° C., from 200° C. to 700° C., from 200° C. to 650° C., from 200° C. to 600° C., from 200° C. to 550° C., from 200° C. to 500° C., from 200° C. to 450° C., from 200° C. to 400° C., from 200° C. to 350° C., from 200° C. to 300° C., from 200° C. to 250° C., from 250° C. to 800° C., from 300° C. to 800° C., from 350° C. to 800° C., from 400° C. to 800° C., from 450° C. to 800° C., from 450° C. to 650° C., from 500° C. to 800° C., from 525° C. to 575° C., from 550° C. to 800° C., from 600° C. to 800° C., from 650° C. to 800° C., from 700° C. to 800° C., or even from 750° C. to 800° C.

It is envisioned that, in various embodiments, the platinum-containing organometallic functionalized zeolite may be allowed to react with the $H_2$ at any combination of temperature and time disclosed herein.

In one or more embodiments, the amount of platinum grafted onto the functionalized zeolite may be quantified by inductively coupled plasma atomic emission spectroscopy (ICP-AES), also referred to as inductively coupled plasma optical emission spectrometry (ICP-OES), which is an analytical technique used for the detection of chemical elements. This type of emission spectroscopy uses inductively coupled plasma to produce excited atoms and ions that emit electromagnetic radiation at wavelengths characteristic of a particular element. The plasma is a high temperature source of ionized source gas (often argon). The plasma is sustained and maintained by inductive coupling from cooled electrical coils at megahertz frequencies. The source temperature is in the range from 6000 K to 10,000 K. The intensity of the emissions from various wavelengths of light is proportional to the concentrations of the elements within the sample.

Generally, the platinum-containing organometallic functionalities may be incorporated onto the framework in a concentration from 0.1 wt % to 15 wt %, from 0.5 wt % to 15 wt %, from 0.65 wt % to 15 wt %, from 1 wt % to 15 wt %, from 1.5 wt % to 15 wt %, from 2 wt % to 15 wt %, from 2.5 wt % to 15 wt %, from 3 wt % to 15 wt %, from 3.5 wt % to 15 wt %, from 4 wt % to 15 wt %, from 4.5 wt % to 15 wt %, from 5 wt % to 15 wt %, 5.5 wt % to 15 wt %, from 6 wt % to 15 wt %, from 6.5 wt % to 15 wt %, from 7 wt % to 15 wt %, from 7.5 wt % to 15 wt %, from 8 wt % to 15 wt %, from 8.5 wt % to 15 wt %, from 9 wt % to 15 wt %, from 9.5 wt % to 15 wt %, from 10 wt % to 15 wt %, from 10.5 wt % to 15 wt %, from 11 wt % to 15 wt %, from 11.5 wt % to 15 wt %, from 12 wt % to 15 wt %, from 12.5 wt % to 15 wt %, from 13 wt % to 15 wt %, from 13.5 wt % to 15 wt %, from 14 wt % to 15 wt %, 14.5 wt % to 15 wt %, from 0.1 wt % to 14.5 wt %, from 0.1 wt % to 14 wt %, from 0.1 wt % to 13.5 wt %, from 0.1 wt % to 13 wt %, from 0.1 wt % to 12.5 wt %, from 0.1 wt % to 12 wt %, from 0.1 wt % to 11.5 wt %, from 0.1 wt % to 11 wt %, from 0.1 wt % to 10.5 wt %, from 0.1 wt % to 10 wt %, from 0.1 wt % to 9.5 wt %, from 0.1 wt % to 9 wt %, from 0.1 wt % to 8.5 wt %, from 0.1 wt % to 8 wt %, from 0.1 wt % to 7.5 wt %, from 0.1 wt % to 7 wt %, from 0.1 wt % to 6.5 wt %, from 0.1 wt % to 6 wt %, from 0.1 wt % to 5.5 wt %, from 0.1 wt % to 5 wt %, from 0.1 wt % to 4.5 wt %, from 0.1 wt % to 4 wt %, from 0.1 wt % to 3.5 wt %, from 0.1 wt % to 3 wt %, from 0.1 wt % to 2.5 wt %, from 0.1 wt % to 2 wt %, from 0.1 wt % to 1.5 wt %, from 0.1 wt % to 1 wt %, from 0.1 wt % to 0.65 wt %, or even from 0.1 wt % to 0.5 wt %. In embodiments, the platinum content may increase with increasing reaction time. For example, in certain embodiments, with a reaction time of 2 hours, the platinum content may be about 0.1 wt %, whereas with a reaction time of 20 hours, the platinum content may be about 15 wt %.

In embodiments, the platinum nanoparticles produced in accordance with this two-step reaction may have a particle size from 1 nm to 10 nm, from 1.5 nm to 10 nm, from 2 nm to 10 nm, from 2.5 nm to 10 nm, from 3 nm to 10 nm, from 3.5 nm to 10 nm, from 4 nm to 10 nm, from 4.5 nm to 10 nm, from 5 nm to 10 nm, from 5.5 nm to 10 nm, from 6 nm to 10 nm, from 6.5 nm to 10 nm, from 7 nm to 10 nm, from 7.5 nm to 10 nm, from 8 nm to 10 nm, from 8.5 nm to 10 nm, from 9 nm to 10 nm, from 9.5 nm to 10 nm, from 1 nm to 9.5 nm, from 1 nm to 9 nm, from 1 nm to 8.5 nm, from 1 nm to 8 nm, from 1 nm to 7.5 nm, from 1 nm to 7 nm, from 1 nm to 6.5 nm, from 1 nm to 6 nm, from 1 nm to 5.5 nm, from 1 nm to 5 nm, from 1 nm to 4.5 nm, from 1 nm to 4 nm, from 1 nm to 3.5 nm, from 1 nm to 3 nm, from 1 nm to 2.5 nm, from 1 nm to 2 nm, or even from 1 nm to 1.5 nm. It should be understood that this particle size refers to the particle size of the platinum nanoparticles on the zeolite, not the particle size of the zeolite with the platinum nanoparticles.

In one or more embodiments, the presently disclosed functionalized zeolites may be suitable for use as catalysts in refining, petrochemicals, and chemical processing. For example, zeolites may be useful as cracking catalysts in processes such as hydrocracking or fluid catalytic cracking. Table 1 shows some contemplated catalytic functionality for the presently disclosed functionalized zeolites, and provides the type of zeolite that may be desirable. However, it should be understood that the description of Table 1 should not be construed as limiting on the possible uses for functionalized zeolites presently disclosed.

TABLE 1

Catalytic functions of described functionalized zeolites

| Catalytic Reaction | Target Description | Framework of zeolite components of catalyst |
|---|---|---|
| Catalytic cracking | To convert high boiling, high molecular mass hydrocarbon fractions to more valuable gasoline, olefinic gases, and other products | FAU, MFI |
| Hydrocracking | To produce diesel with higher quality | FAU, BEA |
| Gas oil hydrotreating/Lube hydrotreating | Maximizing production of premium distillate by catalytic dewaxing | FAU, MFI |
| Alkane cracking and alkylation of aromatics | To improve octane and production of gasolines and BTX | MFI |
| Olefin oligomerization | To convert light olefins to gasoline & distillate | FER, MFI |
| Methanol dehydration to olefins | To produce light olefins from methanol | CHA, MFI |
| Heavy aromatics transalkylation | To produce xylene from C9+ | MFI, FAU |

TABLE 1-continued

Catalytic functions of described functionalized zeolites

| Catalytic Reaction | Target Description | Framework of zeolite components of catalyst |
|---|---|---|
| Fischer-Tropsch Synthesis FT | To produce gasoline, hydrocarbons, and linear alpha-olefins, mixture of oxygenates | MFI |
| $CO_2$ to fuels and chemicals | To make organic chemicals, materials, and carbohydrates | MFI |

According to additional embodiments, the presently disclosed functionalized zeolites may be suitable for use in separation and/or mass capture processes. For example, the presently disclosed functionalized zeolites may be useful for adsorbing $CO_2$ and for separating p-xylene from its isomers.

According to an aspect, either alone or in combination with any other aspect, a functionalized fibrous hierarchical zeolite includes a framework comprising aluminum atoms, silicon atoms, and oxygen atoms, the framework further comprising a plurality of micropores and a plurality of mesopores. The functionalized fibrous hierarchical zeolite is functionalized with at least one amine. A plurality of nanoparticles comprising platinum are immobilized on the framework.

According to a second aspect, either alone or in combination with any other aspect, one or more of the at least one amine forms a dative bond with one or more of the aluminum atoms of the framework.

According to a third aspect, either alone or in combination with any other aspect, one or more of the at least one amine associates with the nanoparticles comprising platinum, thereby immobilizing the nanoparticles comprising platinum.

According to a fourth aspect, either alone or in combination with any other aspect, the framework is selected from the group consisting of an MFI, an FAU, a BEA, an MOR, and a combination of two or more thereof.

According to a fifth aspect, either alone or in combination with any other aspect, the framework is an MFI.

According to a sixth aspect, either alone or in combination with any other aspect, the nanoparticles comprising platinum have an average particle size from 1 nm to 10 nm.

According to a seventh aspect, either alone or in combination with any other aspect, the nanoparticles comprising platinum have an average particle size from 1 nm to 5 nm.

According to an eighth aspect, either alone or in combination with any other aspect, a method for making a functionalized fibrous hierarchical zeolite comprising a plurality of nanoparticles comprising platinum includes contacting a fibrous hierarchical zeolite with an organometallic complex comprising a platinum atom, thereby producing a functionalized zeolite comprising isolated terminal organometallic functionalities comprising a platinum atom; and contacting the functionalized zeolite comprising isolated terminal organometallic functionalities comprising a platinum atom with an atmosphere comprising $H_2$, thereby producing the functionalized zeolite comprising a plurality of nanoparticles comprising platinum immobilized on the microporous framework. The fibrous hierarchical zeolite includes a framework comprising aluminum atoms, silicon atoms, and oxygen atoms, the framework further comprising a plurality of micropores and a plurality of mesopores, the fibrous hierarchical zeolite being functionalized with at least one terminal amine. The nanoparticles comprising platinum are immobilized on the framework.

According to a ninth aspect, either alone or in combination with any other aspect, one or more of the at least one amine forms a dative bond with one or more of the aluminum atoms of the framework.

According to a tenth aspect, either alone or in combination with any other aspect, one or more of the at least one amine associates with the nanoparticles comprising platinum, thereby immobilizing the nanoparticles comprising platinum.

According to an eleventh aspect, either alone or in combination with any other aspect, the framework is selected from the group consisting of an MFI, an FAU, a BEA, an MOR, and a combination of two or more thereof.

According to a twelfth aspect, either alone or in combination with any other aspect, the framework is an MFI.

According to a thirteenth aspect, either alone or in combination with any other aspect, the organometallic complex is selected from the group consisting of a complex of formula (10), a complex of formula (11), a complex of formula (12), a complex of formula (13), a complex of formula (14), a complex of formula (15), a complex of formula (16), a complex of formula (17), a complex of formula (18), and a combination of two or more thereof.

According to a fourteenth aspect, either alone or in combination with any other aspect, the organometallic complex is a complex of formula (10).

According to a fifteenth aspect, either alone or in combination with any other aspect, the contacting takes place at a temperature from 300° C. to 700° C.

According to a sixteenth aspect, either alone or in combination with any other aspect, the contacting takes place for from 1 hours to 5 hours.

EXAMPLES

The various embodiments of methods and systems for forming functionalized zeolites will be further clarified by the following examples. The examples are illustrative in nature and should not be understood to limit the subject matter of the present disclosure.

Example 1—Synthesis of Mesoporous ZSM-5 Zeolite

A mesoporous ZSM-5 zeolite was formed having a Si/Al molar ratio of 30. In a typical synthesis, a homogeneous solution was prepared by dissolving 0.75 g of NaOH and 0.21 g of $NaAlO_2$ in 59.0 g of deionized water. This was followed by the addition 2.0 g of PDAMAB-TPHAB polymer under vigorous stirring at 60° C. After stirring for 1 hour, 16.5 g of tetraethyl orthosilicate (TEOS) was added dropwise to the solution and further stirred for 12 hours at 60° C. The obtained viscous gel was subjected to hydrothermal treatment at 150° C. for 60 hours. The resulting solids were washed, filtered and dried at 110° C. for overnight. The as-synthesized solids were calcined at 550° C. for 6 hours at a heating rate of 1° C./min under static conditions. Then, an ion-exchange procedure was performed using 1.0 M $NH_4NO_3$ solution at 80° C. The ion-exchanging process was repeated thrice prior to calcination at 550° C. for 4 hours in air to generate the H-form of ZSM-5 zeolite.

Example 2—Synthesis of a ZSM-5 Zeolite Dehydroxylated at 700° C.

A dehydroxylated ZSM-5 zeolite was formed by treating 2 g of the mesoporous ZSM-5 zeolite of Example 1 at a temperature of 700° C. and a pressure of $10^{-5}$ mbar for a time of 20 hours. Heating occurred at a rate of 150° C./hr.

Example 3—Synthesis of an Amine Modified ZSM-5 Zeolite

The dehydroxylated ZSM-5 zeolite of Example 2 was treated with ammonia at a temperature of 500° C. for 6 hours to produce an amine-modified ZSM-5 zeolite.

Example 4—Synthesis of a Platinum-Containing Organometallic Functionalized Amine-Modified ZSM-5 Zeolite The amine modified ZSM-5 zeolite of Example 3 (0.225 mmol of $-NH_2$ concentration, 1 equiv.) was introduced to a first compartment of a double schlenk flask under an argon atmosphere in a glove box. A solution of $[Pt(COD)(Me)_2]$ (75 mg, 0.225 mmol, 1 equiv.), which is the complex of formula (10), was added to the second compartment of the double schlenk flask in dry, degassed benzene (8 mL) at room temperature. The $[Pt(COD)(Me)_2]$ solution was transferred to the first compartment, and the reaction mixture was stirred at room temperature for 20 hours, which led to the formation of a white solid material identified as the desired platinum-containing organometallic functionalized zeolite. The solid material was isolated from the liquid phase and was washed with dry benzene (3×8 mL) to eliminate unreacted $[Pt(COD)(Me)_2]$. Finally, the platinum-containing organometallic functionalized ZSM-5 zeolite was dried at 80° C. under dynamic vacuum ($10^{-5}$ mbar) overnight.

The platinum-containing organometallic functionalized ZSM-5 zeolite of Example 4 was characterized using $^1$H-MAS-SS-NMR spectroscopy (600 MHz, 25° C.). The $^1$H-MAS-SS-NMR spectrum of the platinum-containing organometallic functionalized ZSM-5 zeolite of Example 4 is displayed in FIG. 2, which exhibits signals as follows. δ 4.77 (C$\underline{H}$=C$\underline{H}$, Cyclo, br), 1.33 (C$\underline{H}_2$, Cyclo, br), 0.89 (Pt-N$\underline{H}$—Si≡, br), 0.62 (unreacted≡Si—N$\underline{H}_2$, br), 0.02 (Pt-C$\underline{H}_3$, br).

The platinum-containing organometallic functionalized ZSM-5 zeolite of Example 4 was analyzed by $^{27}$Al-SS-NMR spectroscopy (900 MHz, 25° C.). The $^{27}$Al-SS-NMR spectrum of the platinum-containing organometallic functionalized ZSM-5 zeolite of Example 4 is displayed in FIG. 3, which exhibits a peak at δ 55.08 ppm, corresponding to a tetrahedral aluminum site.

Figure 4:
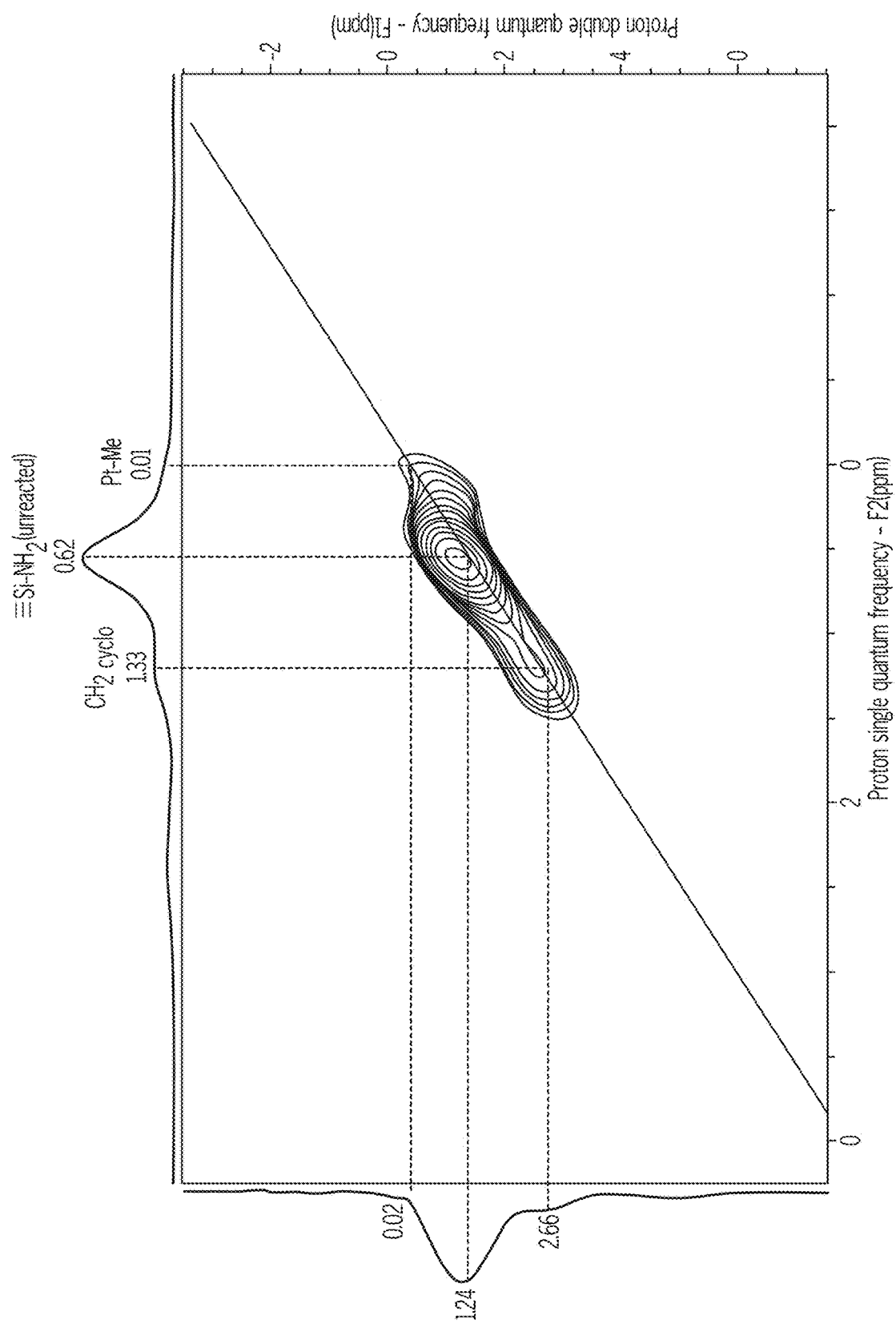
FIG. 4 provides the 2D double quantum $^1$H—$^1$H solid state NMR spectrum of a platinum-containing organometallic functionalized ZSM-5 zeolite.

The platinum-containing organometallic functionalized ZSM-5 zeolite of Example 4 was analyzed by two dimensional double quantum solid state proton nuclear magnetic resonance (2D DQ $^1$H—$^1$H SS NMR) spectroscopy. The 2D DQ $^1$H—$^1$H SS NMR spectrum of the platinum-containing organometallic functionalized ZSM-5 zeolite of Example 4 is displayed in FIG. 4. This spectrum shows strong peaks on the 2:1 diagonal at 0.62 ppm on the F2 axis (proton single quantum frequency) and at 1.24 ppm on the F1 axis (proton double quantum frequency) that correspond to the unreacted silylamine moiety. Additional peaks appear at 1.33 ppm on the F2 axis and at 2.66 ppm on the F1 axis, which correspond to cyclic methylene ($CH_2$) groups. Finally, peaks appear at 0.01 ppm on the F2 axis and 0.02 on the F1 axis, which corresponds to protons on the methyl group bound to the platinum atom.

Example 5—Synthesis of a Platinum-Nanoparticle Functionalized Amine-Modified ZSM-5 Zeolite The platinum-containing organometallic functionalized ZSM-5 zeolite of Example 4 (500 mg) was placed in a quartz tube under a dynamic hydrogen flow (5% $H_2$ in Ar) at 500° C. for 2 h. The temperature program was set to 500° C./hour. The furnace was cooled to room temperature in the same flow. Then, the resulting grey material was collected and determined to be the platinum-nanoparticle functionalized ZSM-5 zeolite, which was stored in the glove box for further characterization.

Figure 5:
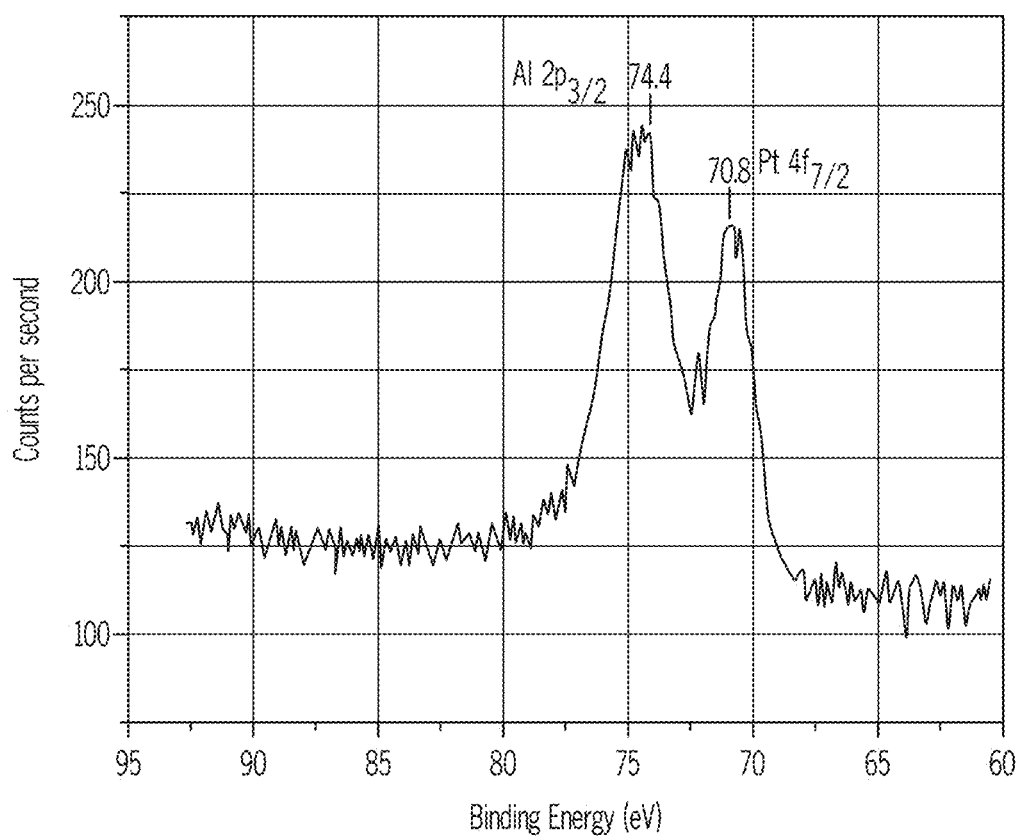
FIG. 5 provides the X-ray photoelectron spectroscopy of a platinum-nanoparticle functionalized ZSM-5 zeolite.
Figure 6:
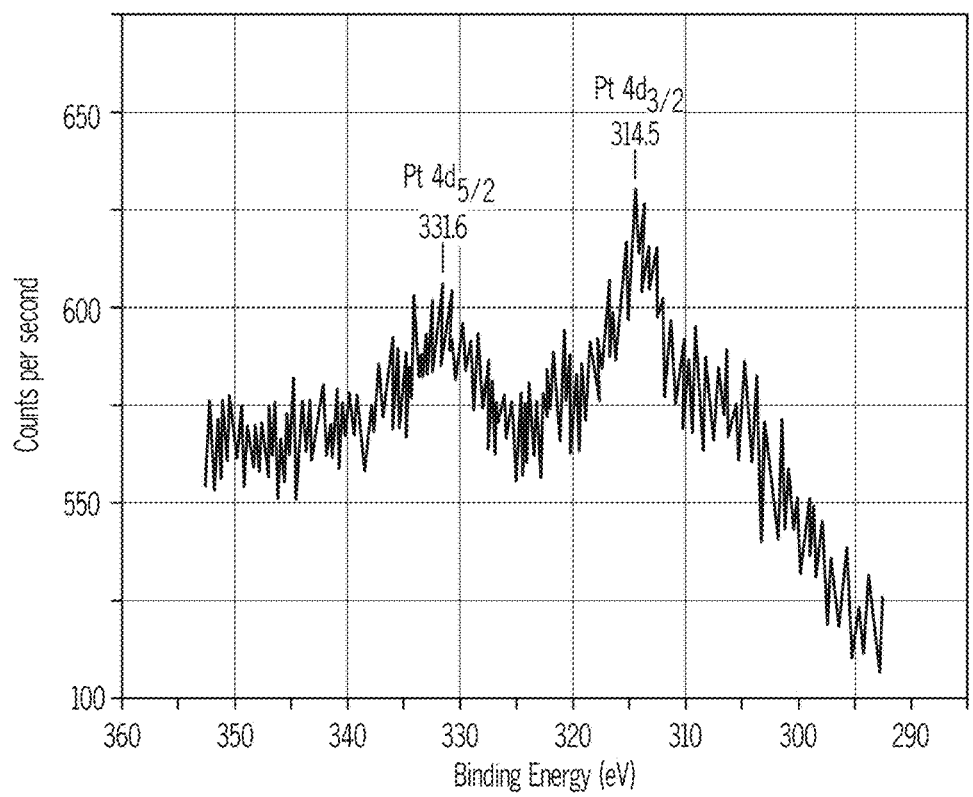
FIG. 6 provides the X-ray photoelectron spectroscopy of a platinum-nanoparticle functionalized amine-modified ZSM-5 zeolite.
Figure 7:
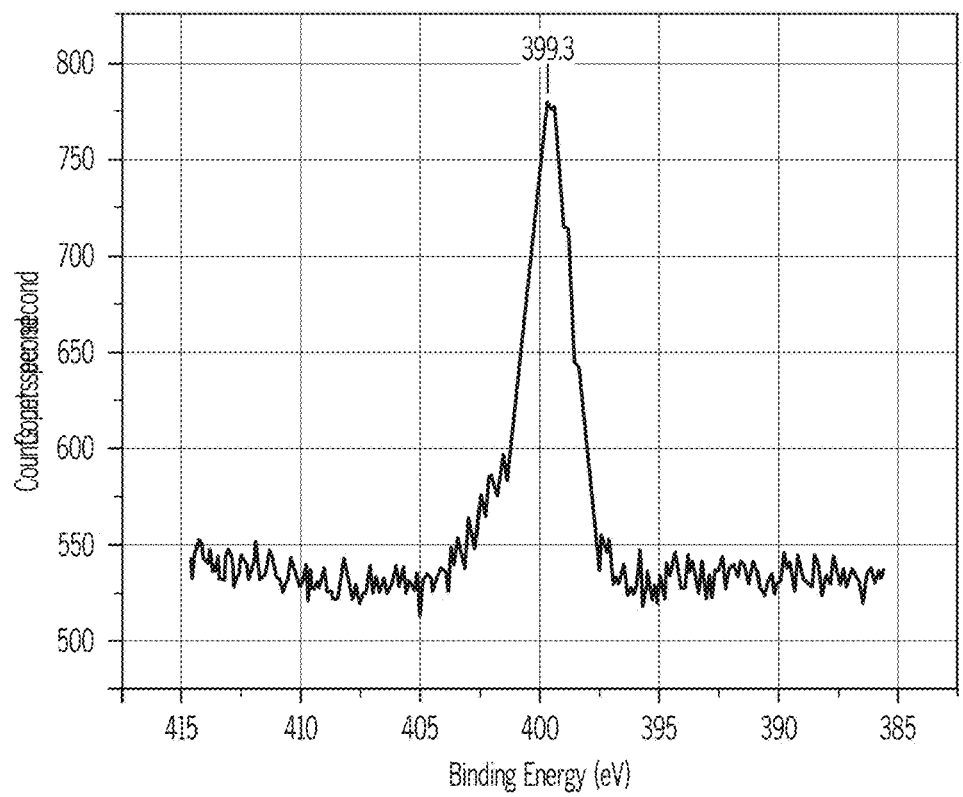
FIG. 7 provides the X-ray photoelectron spectroscopy of a platinum-nanoparticle functionalized amine-modified ZSM-5 zeolite.

X-ray photoelectron spectroscopy (XPS) of the platinum-nanoparticle functionalized ZSM-5 zeolite of Example 5 is shown in FIG. 5 (Al 2p and Pt 4f), FIG. 6 (Pt 4d), and FIG. 7 (N 1s). As shown in FIG. 5, the binding energy signal of Pt $4f_{7/2}$ at 70.8 eV corresponds to the Pt(0) atom in material and thus, the binding energy signal of Pt $4f_{5/2}$ overlapped with aluminosilicate as Al $2p_{3/2}$ at 74.4 eV. Binding energy signals of Pt $4d_{3/2}$ and Pt $4d_{5/2}$, 314.5 eV and 331.6 eV respectively, also correspond to the Pt(0) atom in the material (FIG. 6). This analysis also confirmed the presence of nitrogen (Si—$NH_2$), with a binding energy signal of N 1s at 399.3 eV (FIG. 7). The XPS experiments were performed on a Kratos Axis Ultra DLD instrument equipped with a monochromatic Al Kα x-ray source (hv=1486.6 eV) operated at a power of 75 W and under UHV conditions in the range of ~$10^{-9}$ mbar. All spectra were recorded in hybrid mode using electrostatic and magnetic lenses and an aperture slot of 300 μm×700 μm. The survey and high-resolution spectra were acquired at fixed analyzer pass energies of 160 eV and 20 eV, respectively. The samples were mounted in floating mode in order to avoid differential charging. Therefore, XPS spectra were acquired using charge neutralization. Because the samples are air-sensitive, they were transferred to the XPS instrument and analyzed without exposing them to the ambient air. For this purpose, samples were first prepared inside the glovebox always kept under argon atmosphere and were subsequently transferred to the XPS instrument using a special transfer chamber filled with argon prior to be sealed. The samples were promptly analyzed after being loaded into the instrument.

Figure 10:
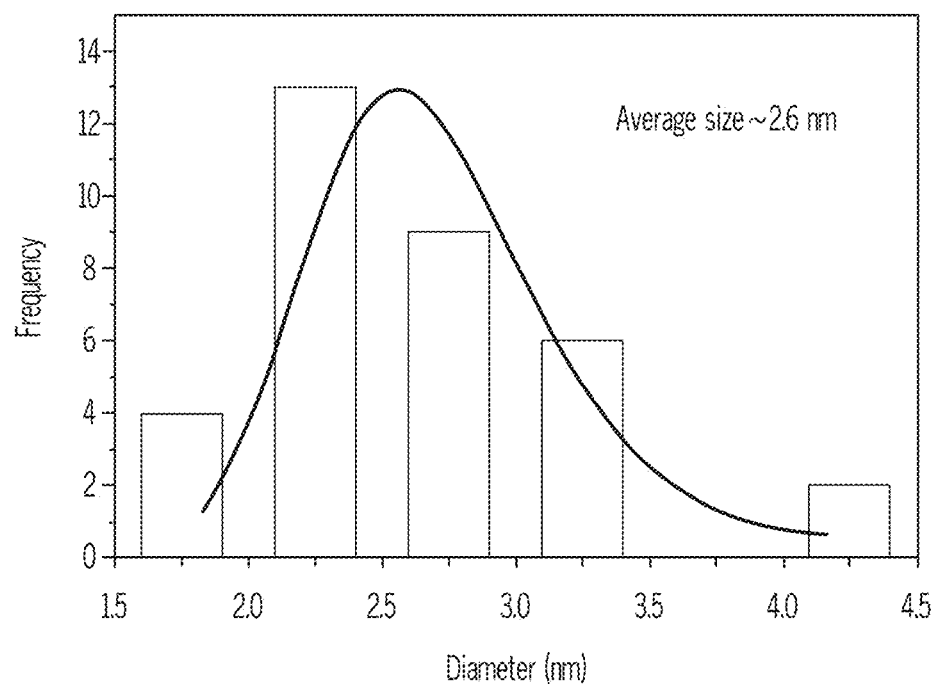
FIG. 10 provides the particle size distribution of the platinum-nanoparticles present on a platinum-nanoparticle functionalized amine-modified ZSM-5 zeolite.

The microscopic observations of the platinum-nanoparticle functionalized ZSM-5 zeolite of Example 5 were performed under an inert atmosphere using scanning transmission electron microscopy (HAADF-STEM), as shown in FIG. 8. This experiment confirms the presence of platinum and carbon, which are displayed on the surface of the platinum-nanoparticle functionalized ZSM-5 zeolite of Example 5. High-resolution transmission electron microscopy (HR-TEM) images, FIG. 9, of the platinum-nanoparticle functionalized ZSM-5 zeolite of Example 5 clearly show the lattice fringes originating from the MFI framework, which remains unchanged from the dehydroxylated ZSM-5 zeolite of Example 2. FIG. 10 provides the particle size distribution of the platinum-nanoparticles present on a platinum-nanoparticle functionalized amine-modified ZSM-5 zeolite for the corresponding scanning transmission electron microscopy image. The average particle size was found to be about 2.6 nm. Transmission electron microscopy (TEM) and scanning TEM (STEM) investigations were performed with a ThermoFisher FEI Titan 80-300 Cubed microscope equipped with a high-brilliance field emission gun (300 kV), a Wien-type FEI monochromator, chemiSTEM™ technology for energy dispersive X-ray spectroscopy (EDX), and a CEOS spherical aberration probe corrector (for the condenser lens system) allowing a final resolution of 0.9 Å in STEM mode. The TEM samples were fully prepared in a glove box under an argon inert atmosphere to avoid any alteration reaction due to the exposure to the air and then transferred directly into a Gatan 618 double-tilt vacuum transfer holder. In that way, the samples were never exposed to the air from the synthesis to the analysis.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

The singular forms "a", "an" and "the" include plural referents, unless the context clearly dictates otherwise.

For the purposes of describing and defining the present disclosure it is noted that the term "about" is utilized in this disclosure to represent the inherent degree of uncertainty that may be attributed to any quantitative comparison, value, measurement, or other representation. The term "about" is also utilized in this disclosure to represent the degree by which a quantitative representation may vary from a stated reference without resulting in a change in the basic function of the subject matter at issue.

As used in this disclosure and in the appended claims, the words "comprise," "has," and "include" and all grammatical variations thereof are each intended to have an open, non-limiting meaning that does not exclude additional elements or steps.

Additionally, the term "consisting essentially of" is used in this disclosure to refer to quantitative values that do not materially affect the basic and novel characteristic(s) of the disclosure. For example, a chemical stream "consisting essentially" of a particular chemical constituent or group of chemical constituents should be understood to mean that the stream includes at least about 99.5% of a that particular chemical constituent or group of chemical constituents.

It should be understood that any two quantitative values assigned to a property may constitute a range of that property, and all combinations of ranges formed from all stated quantitative values of a given property are contemplated in this disclosure.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

The invention claimed is:

1. A functionalized fibrous hierarchical zeolite comprising a framework comprising aluminum atoms, silicon atoms, and oxygen atoms, the framework further comprising a plurality of micropores and a plurality of mesopores, wherein:
   the framework is functionalized with at least one amine;
   a plurality of nanoparticles comprising platinum are immobilized on the framework; and
   a mesopore structure of the functionalized fibrous hierarchical zeolite comprises interconnected intra-crystalline mesopores; and
   the functionalized fibrous hierarchical zeolite is produced by forming a mixture comprising a cationic polymer, wherein the cationic polymer comprises a structure according to:

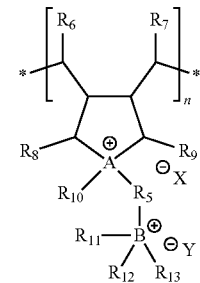

where:
n is the total number of repeating monomers in the polymer;
* denotes a point of attachment to a monomer in the polymer;
X and Y are anions independently selected from Cl$^-$, Br$^-$, F$^-$, I$^-$, $^-$OH, ½SO$_4^{2-}$, ⅓PO$_4^{3-}$, ½S$^{2-}$, AlO$_2^-$, BF$_4^-$, SbF$_6^-$, and B[3,5-(CF$_3$)$_2$C$_6$H$_3$]$_4^-$;
A and B are independently selected from nitrogen and phosphorous;
R$_5$ is a branched or unbranched hydrocarbon chain, optionally comprising one or more heteroatoms; and
R$_6$, R$_7$, R$_8$, R$_9$, R$_{10}$, R$_{11}$, R$_{12}$, and R$_{13}$ are independently selected from a hydrogen atom or a hydrocarbon optionally comprising one or more heteroatoms.

2. The functionalized fibrous hierarchical zeolite of claim 1, wherein one or more of the at least one amine is connected to one or more of the aluminum atoms of the framework by a dative bond.

3. The functionalized fibrous hierarchical zeolite of claim 1, wherein one or more of the at least one amine is connected to the nanoparticles comprising platinum, thereby immobilizing the nanoparticles comprising platinum.

4. The functionalized fibrous hierarchical zeolite of claim 1, wherein the framework is selected from the group consisting of an MFI, an FAU, a BEA, an MOR, and a combination of two or more thereof.

5. The functionalized fibrous hierarchical zeolite of claim 1, wherein the framework is an MFI.

6. The functionalized fibrous hierarchical zeolite of claim 1, wherein the nanoparticles comprising platinum have an average particle size from 1 nm to 10 nm.

7. The functionalized fibrous hierarchical zeolite of claim 1, wherein the nanoparticles comprising platinum have an average particle size from 1 nm to 5 nm.

8. The functionalized fibrous hierarchical zeolite of claim 1, wherein a surface of the functionalized fibrous hierarchical zeolite comprises platinum.

9. The functionalized fibrous hierarchical zeolite of claim 1, wherein the functionalized fibrous hierarchical zeolite comprises reticulate fibers with interconnections, and a dense inner core surrounded by less dense outer fibers.

10. The functionalized fibrous hierarchical zeolite of claim 9, wherein the interconnected intra-crystalline mesopores are positioned within voids of the less dense outer fibers.

11. The functionalized fibrous hierarchical zeolite of claim 1, where:

n is an integer from 10 to 10,000;

A and B are nitrogen;

X and Y are Br—;

$R_5$ is a hydrocarbon chain having 2 to 20 carbon atoms; and $R_6$, $R_7$, $R_8$, $R_9$, $R_{10}$, $R_{11}$, $R_{12}$, and $R_{13}$ are independently selected from a hydrogen atom, a methyl group, an ethyl group, a propyl group, a butyl group, or a pentyl group.

12. A method for making the functionalized fibrous hierarchical zeolite of claim 1 comprising a plurality of nanoparticles comprising platinum, the method comprising:

contacting a fibrous hierarchical zeolite with an organometallic complex comprising a platinum atom, wherein the fibrous hierarchical zeolite comprises:

a framework comprising aluminum atoms, silicon atoms, and oxygen atoms, the framework further comprising a plurality of micropores and a plurality of mesopores, the framework being functionalized with at least one terminal amine, thereby producing a functionalized zeolite comprising isolated terminal organometallic functionalities comprising a platinum atom; and contacting the functionalized zeolite comprising isolated terminal organometallic functionalities comprising a platinum atom with an atmosphere comprising $H_2$, thereby producing the functionalized zeolite comprising a plurality of nanoparticles comprising platinum immobilized on the microporous framework;

wherein:

a mesopore structure of the functionalized fibrous hierarchical zeolite comprises interconnected intra-crystalline mesopores;

the functionalized fibrous hierarchical zeolite is produced by forming a mixture comprising a cationic polymer, wherein the cationic polymer comprises a structure according to:

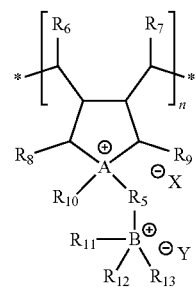

where:

n is the total number of repeating monomers in the polymer;

* denotes a point of attachment to a monomer in the polymer;

X and Y are anions independently selected from $Cl^-$, $Br^-$, $F^-$, $I^-$, $^-OH$, $\frac{1}{2}SO_4^{2-}$, $\frac{1}{3}PO_4^{3-}$, $\frac{1}{2}S^{2-}$, $AlO_2^-$, $BF_4^-$, $SbF_6^-$, and $B[3,5-(CF_3)_2C_6H_3]_4^-$;

A and B are independently selected from nitrogen and phosphorous;

$R_5$ is a branched or unbranched hydrocarbon chain, optionally comprising one or more heteroatoms; and $R_6$, $R_7$, $R_8$, $R_9$, $R_{10}$, $R_{11}$, $R_{12}$, and $R_{13}$ are independently selected from a hydrogen atom or a hydrocarbon optionally comprising one or more heteroatoms.

13. The method of claim 12, wherein one or more of the at least one amine forms a dative bond with one or more of the aluminum atoms of the framework.

14. The method of claim 12, wherein one or more of the at least one amine associates with the nanoparticles comprising platinum, thereby immobilizing the nanoparticles comprising platinum.

15. The method of claim 12, wherein the framework is selected from the group consisting of an MFI, an FAU, a BEA, an MOR, and a combination of two or more thereof.

16. The method of claim 12, wherein the framework is an MFI.

17. The method of claim 12, wherein the organometallic complex is selected from the group consisting of a complex of formula (10), a complex of formula (11), a complex of formula (12), a complex of formula (13), a complex of formula (14), a complex of formula (15), a complex of formula (16), a complex of formula (17), a complex of formula (18), and a combination of two or more thereof.

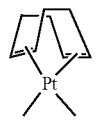
(10)

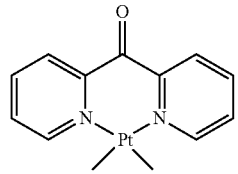
(11)

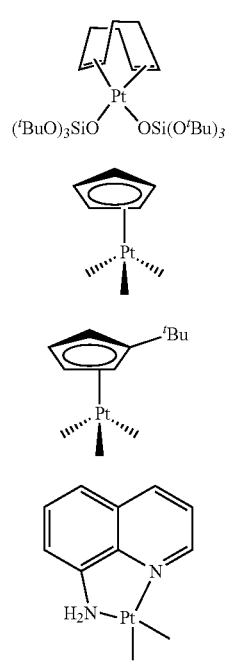
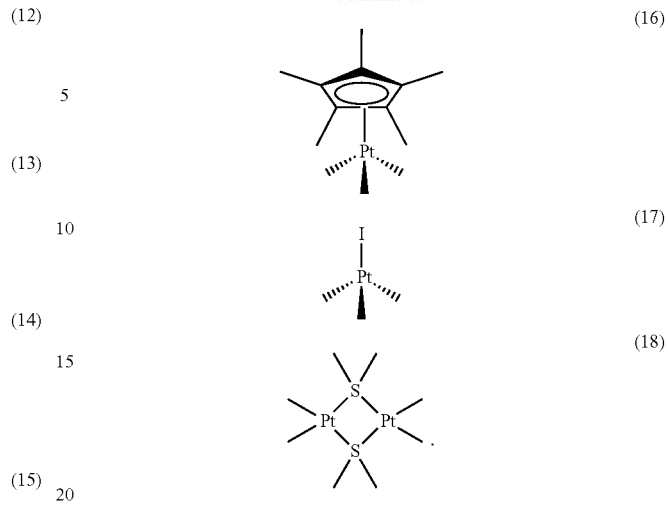
18. The method of claim 17, wherein the organometallic complex is a complex of formula (10).
19. The method of claim 12, wherein the contacting takes place at a temperature from 300° C. to 700° C.
* * * * *